(12) United States Patent
Becker et al.

(10) Patent No.: US 7,218,624 B2
(45) Date of Patent: May 15, 2007

(54) USER EQUIPMENT AND BASE STATION PERFORMING DATA DETECTION USING A SCALAR ARRAY

(75) Inventors: Peter E. Becker, Coatesville, PA (US); Shane S. Supplee, Coatesville, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1089 days.

(21) Appl. No.: 10/172,113

(22) Filed: Jun. 14, 2002

(65) Prior Publication Data
US 2003/0091007 A1    May 15, 2003

Related U.S. Application Data

(63) Continuation-in-part of application No. 10/083,189, filed on Feb. 26, 2002, now abandoned.

(60) Provisional application No. 60/332,950, filed on Nov. 14, 2001.

(51) Int. Cl.
*H04B 7/216* (2006.01)

(52) U.S. Cl. .............. 370/335; 370/342; 375/149; 375/229

(58) Field of Classification Search .............. None
See application file for complete search history.

(56) References Cited

U.S. PATENT DOCUMENTS

| | | | |
|---|---|---|---|
| 4,964,126 A | 10/1990 | Musicus | |
| 5,630,154 A | 5/1997 | Bolstad | |
| 6,064,689 A * | 5/2000 | Vollmer et al. | 375/149 |
| 6,707,864 B2 * | 3/2004 | Kim | 375/343 |
| 6,714,527 B2 * | 3/2004 | Kim et al. | 370/335 |
| 6,870,882 B1 * | 3/2005 | Al-Dhahir et al. | 375/233 |
| 6,937,644 B2 * | 8/2005 | Pan et al. | 375/147 |
| 6,985,513 B2 * | 1/2006 | Zeira | 375/147 |
| 2003/0026325 A1 * | 2/2003 | De et al. | 375/147 |

FOREIGN PATENT DOCUMENTS

JP     10003468     1/1998

OTHER PUBLICATIONS

Golub et al., "Matrix Computations (Johns Hopkins Series in the Mathematical Sciences)," 3rd Edition, Chapter 4, "Special Linear Systems," pp. 133-205.

* cited by examiner

*Primary Examiner*—Doris H. To
*Assistant Examiner*—Soon D. Hyun
(74) *Attorney, Agent, or Firm*—Volpe and Koenig, P.C.

(57) ABSTRACT

A user equipment or base station recovers data from a plurality of data signals received as a received vector. The user equipment determines data of the received vector by determining a Cholesky factor of an N by N matrix and using the determined Cholesky factor in forward and backward substitution to determine data of the received data signals. The user equipment or base station comprises an array of at most N scalar processing elements. The array has input for receiving elements from the N by N matrix and the received vector. Each scalar processing element is used in determining the Cholesky factor and performs forward and backward substitution. The array outputs data of the received vector.

20 Claims, 35 Drawing Sheets

FIG. 3a
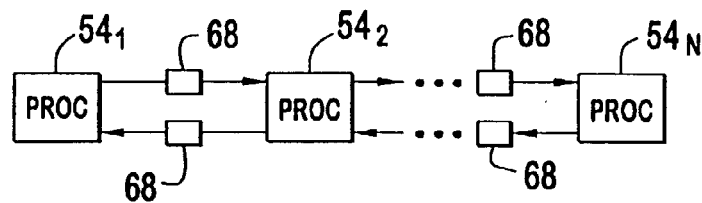
FIG. 3b
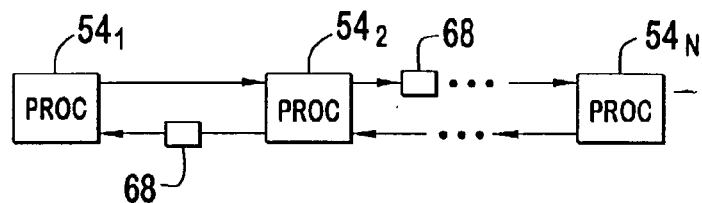
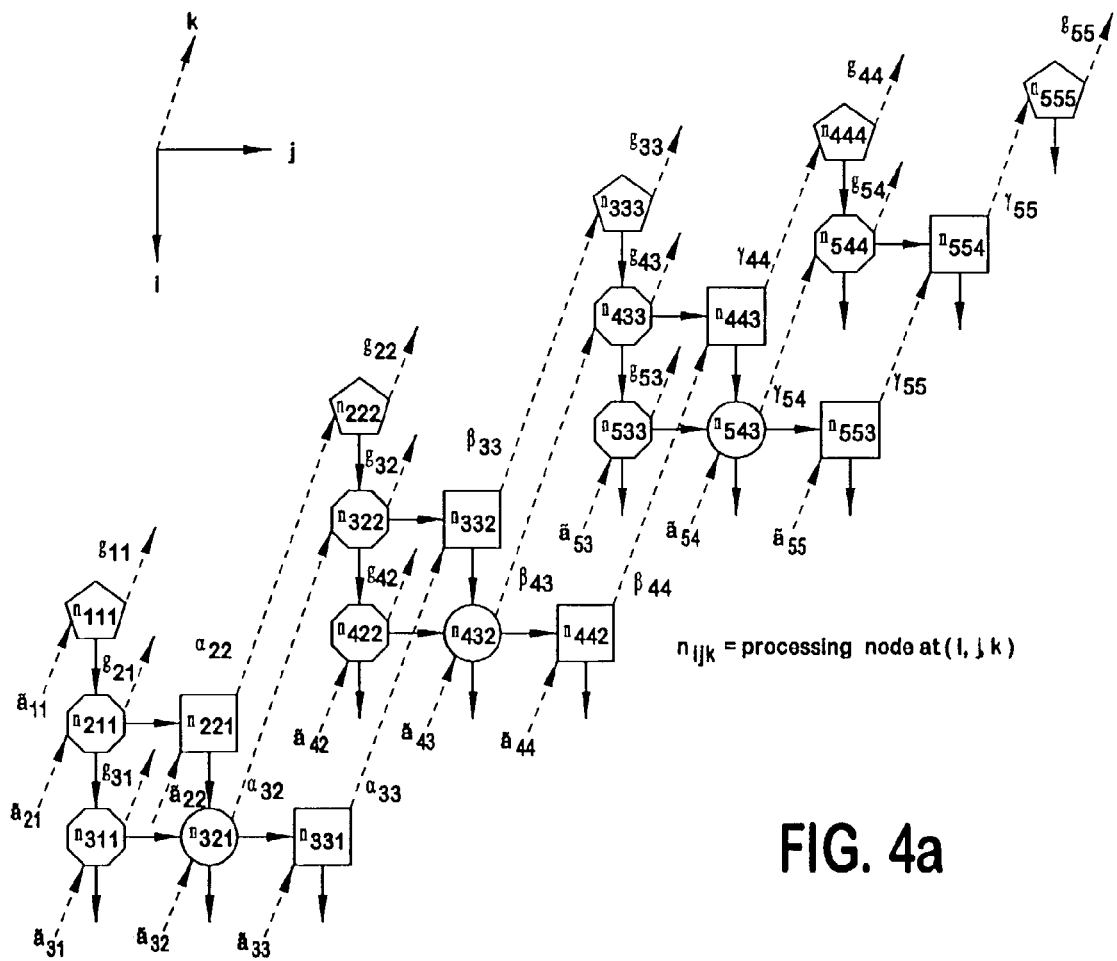
FIG. 4a

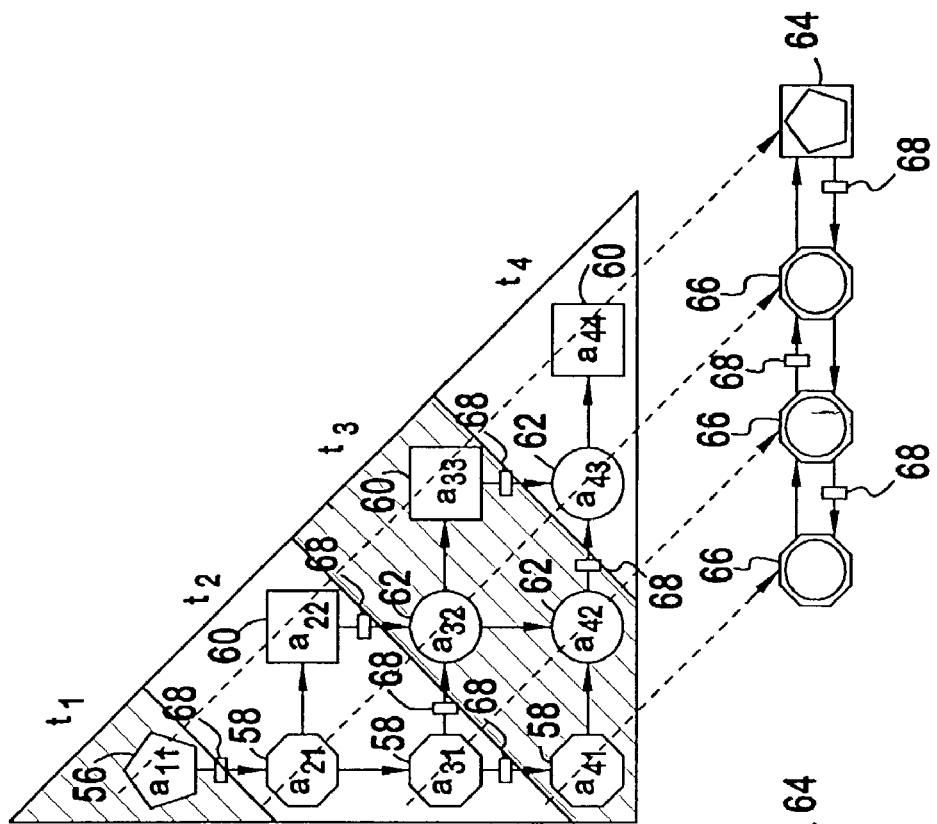
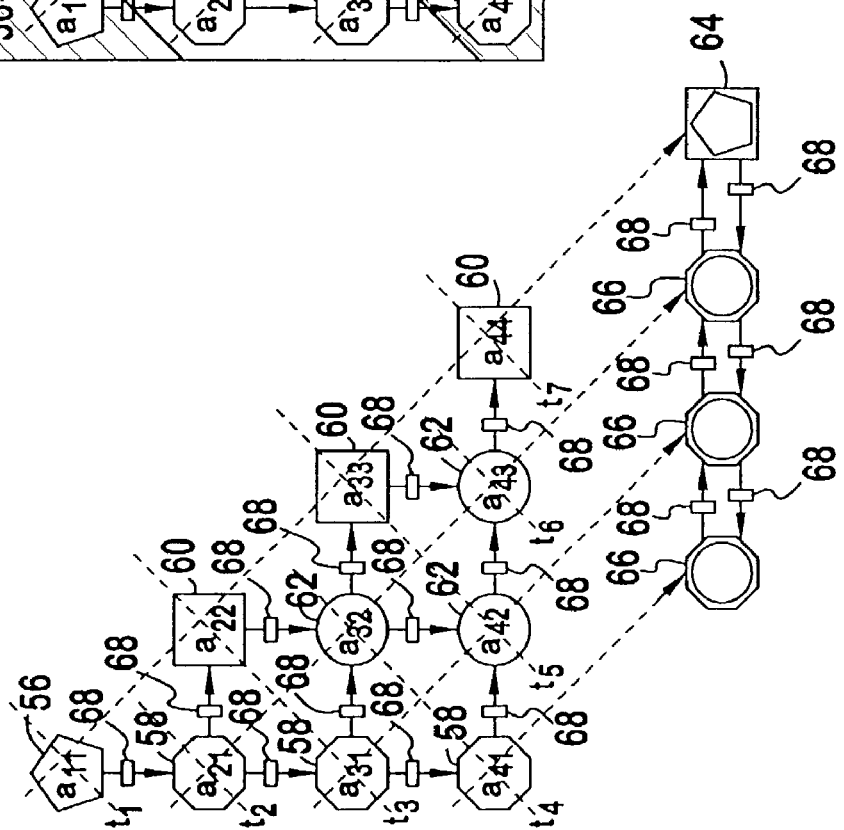

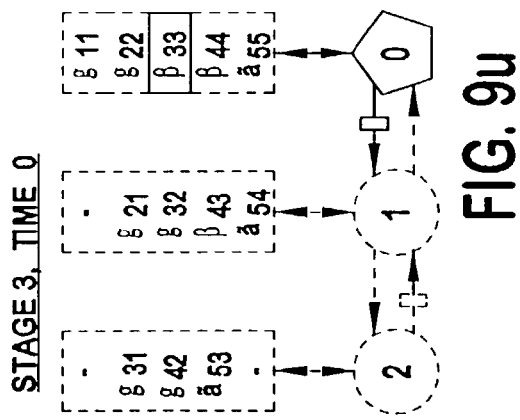
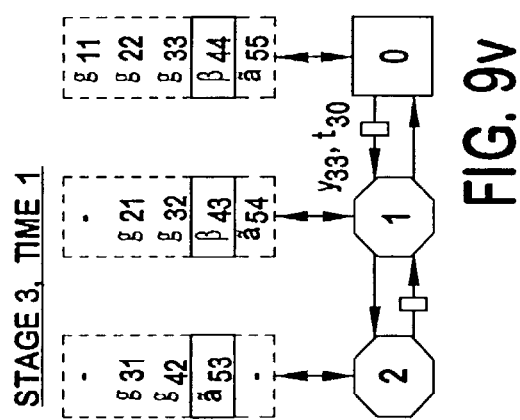
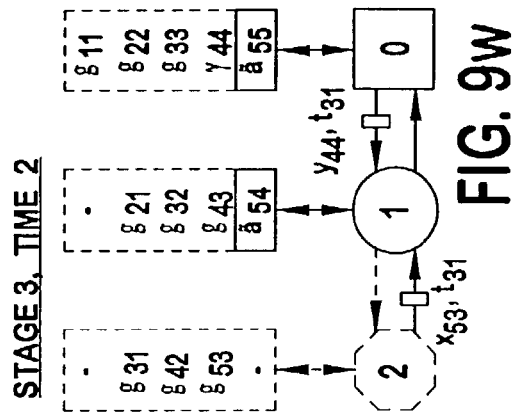
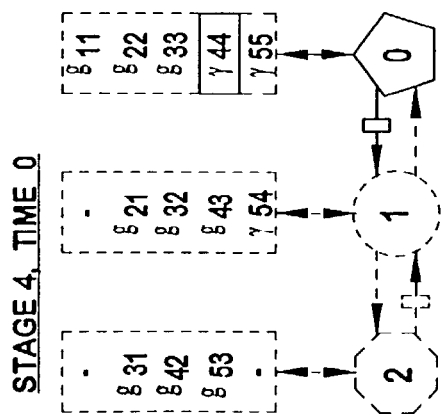
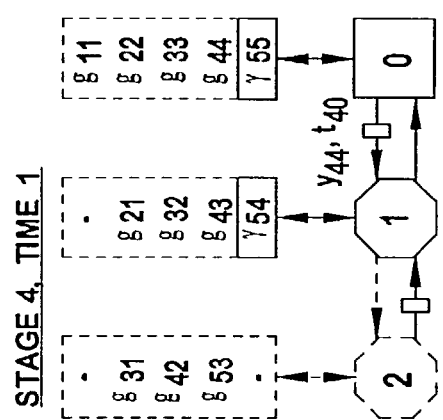
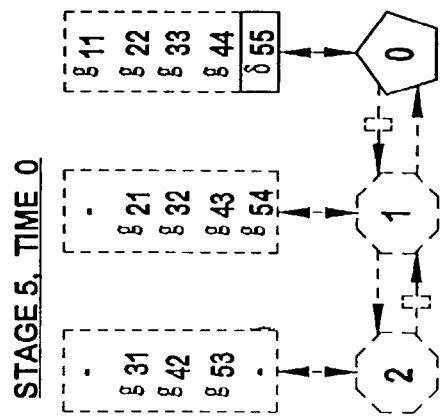

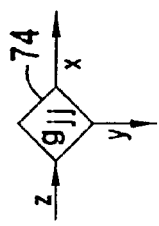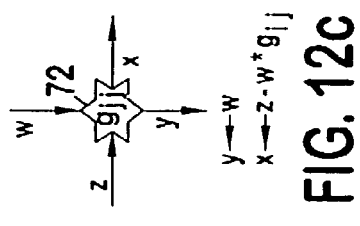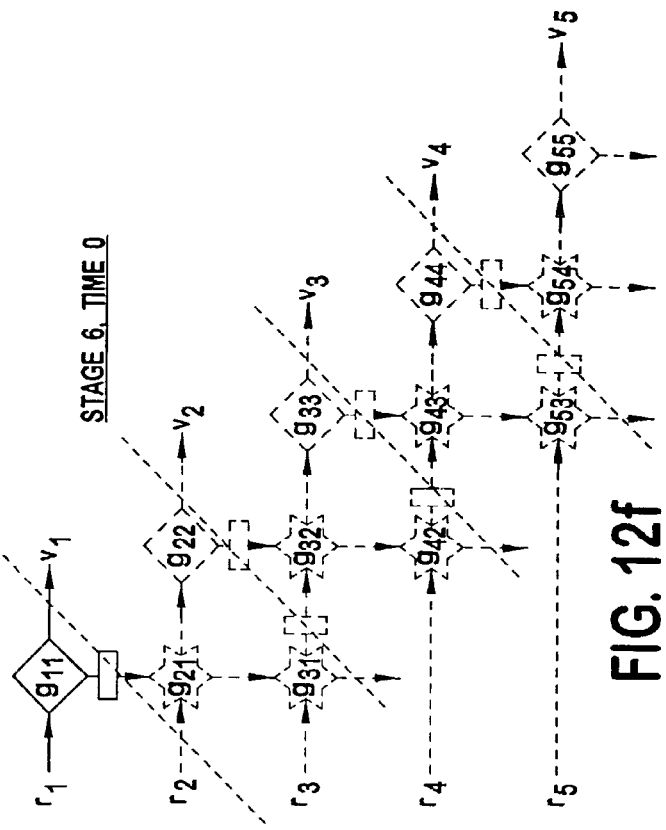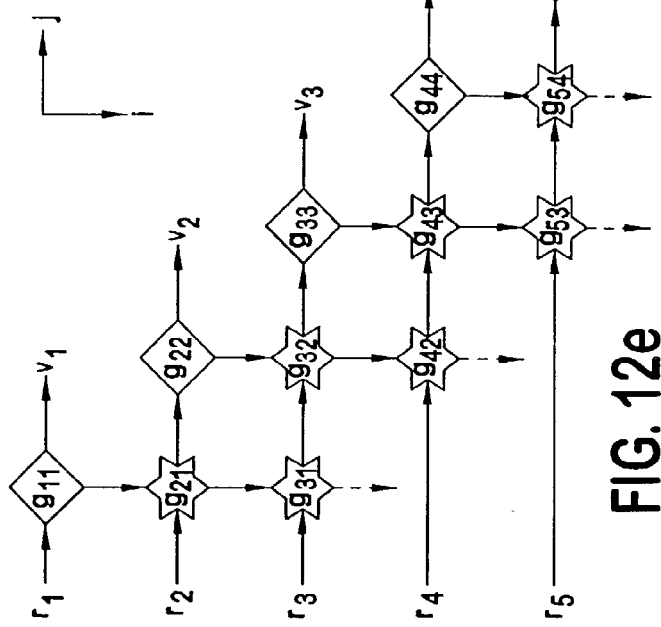

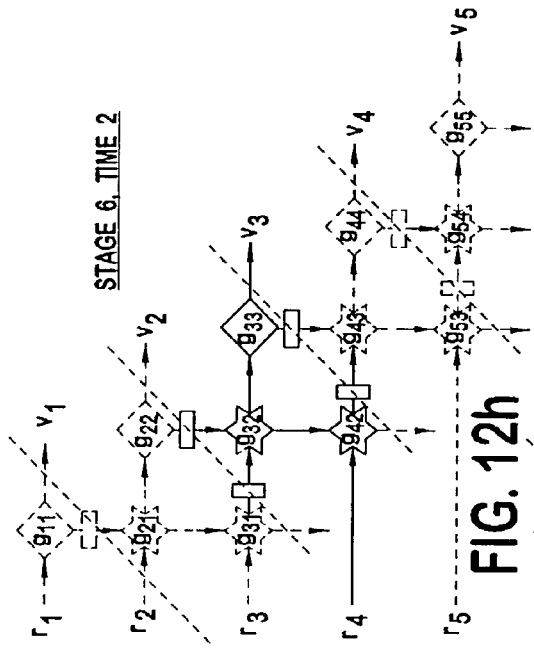
FIG. 12h STAGE 6, TIME 2
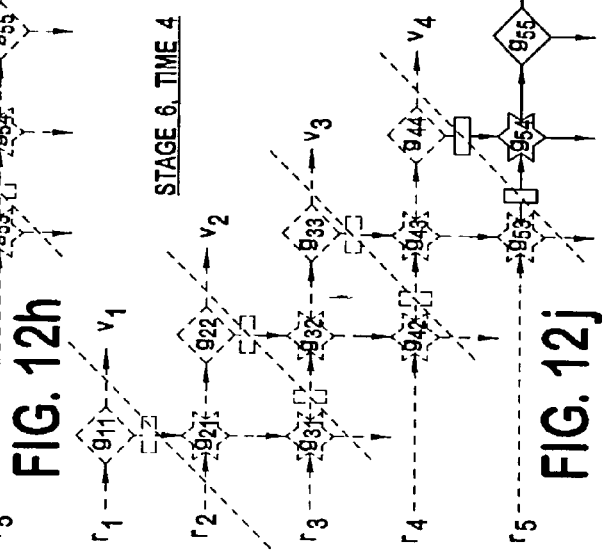
FIG. 12j STAGE 6, TIME 4
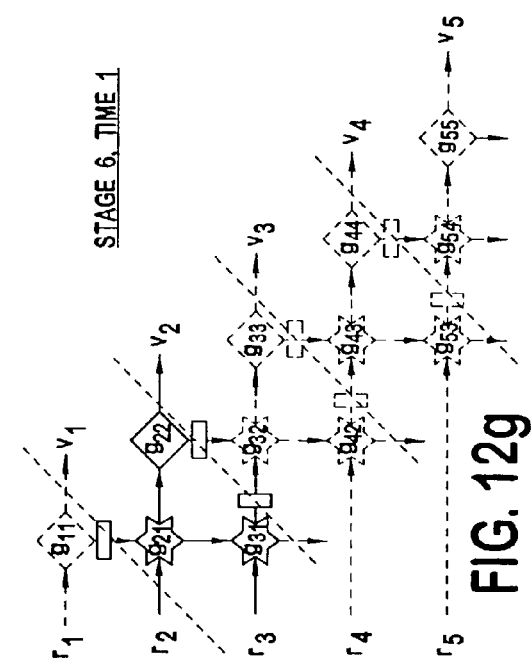
FIG. 12g STAGE 6, TIME 1
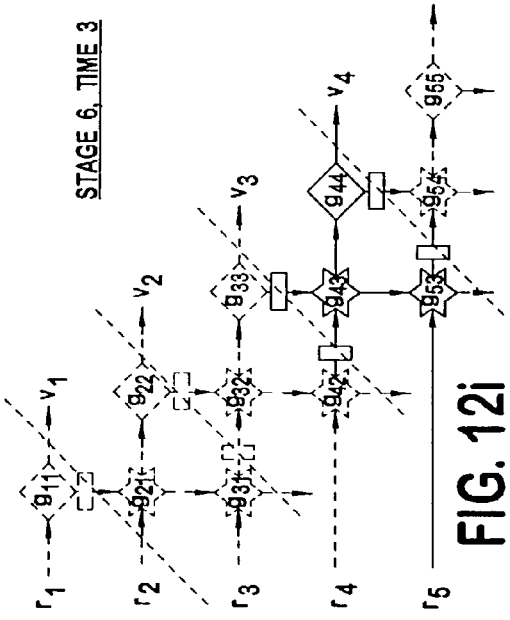
FIG. 12i STAGE 6, TIME 3

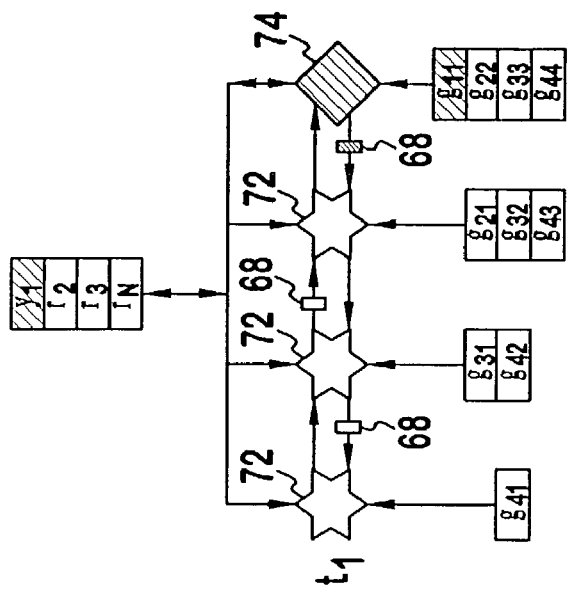
FIG. 14a
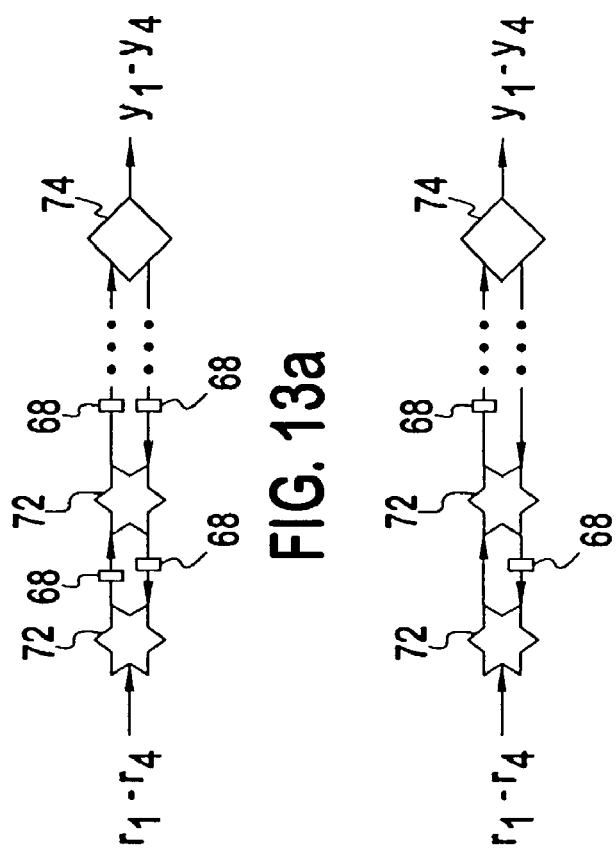
FIG. 13a
FIG. 13b

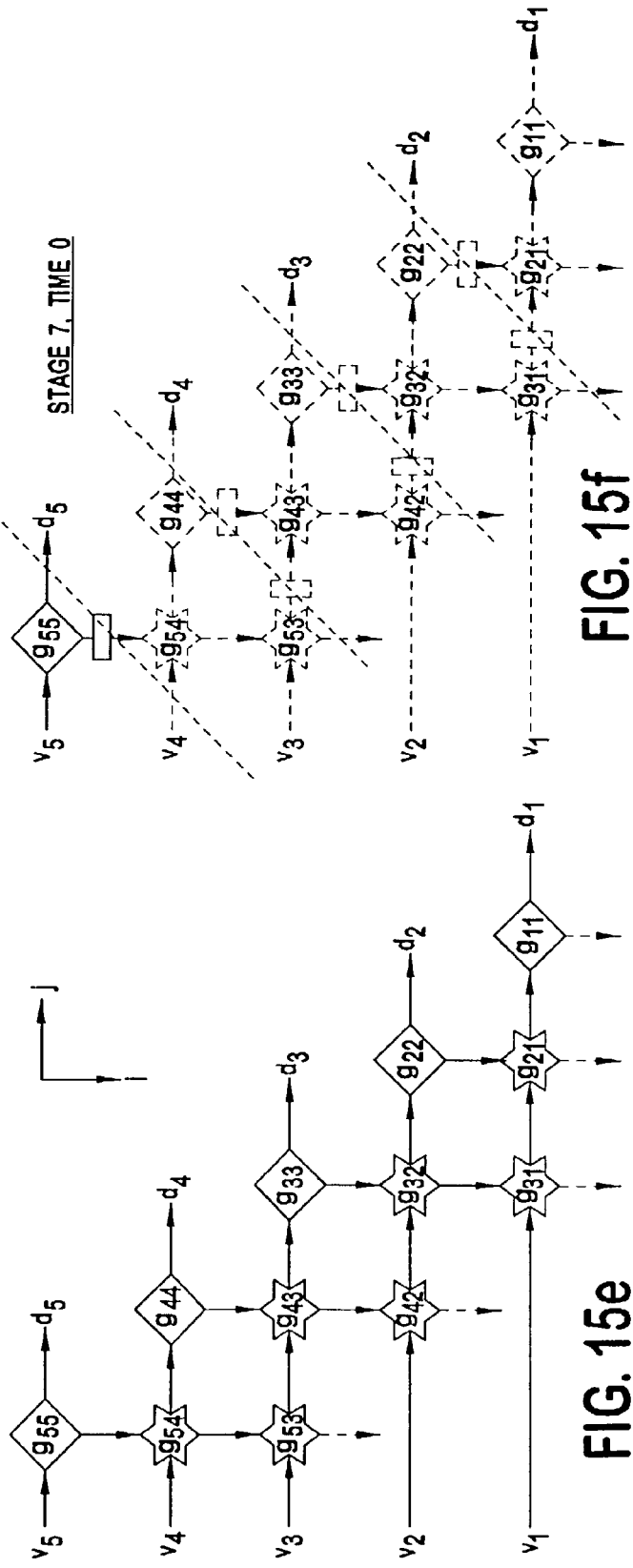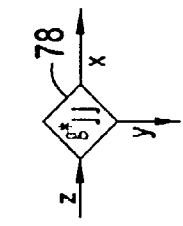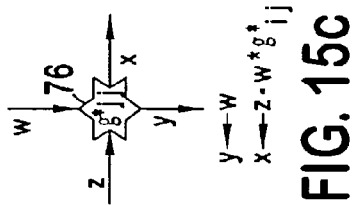

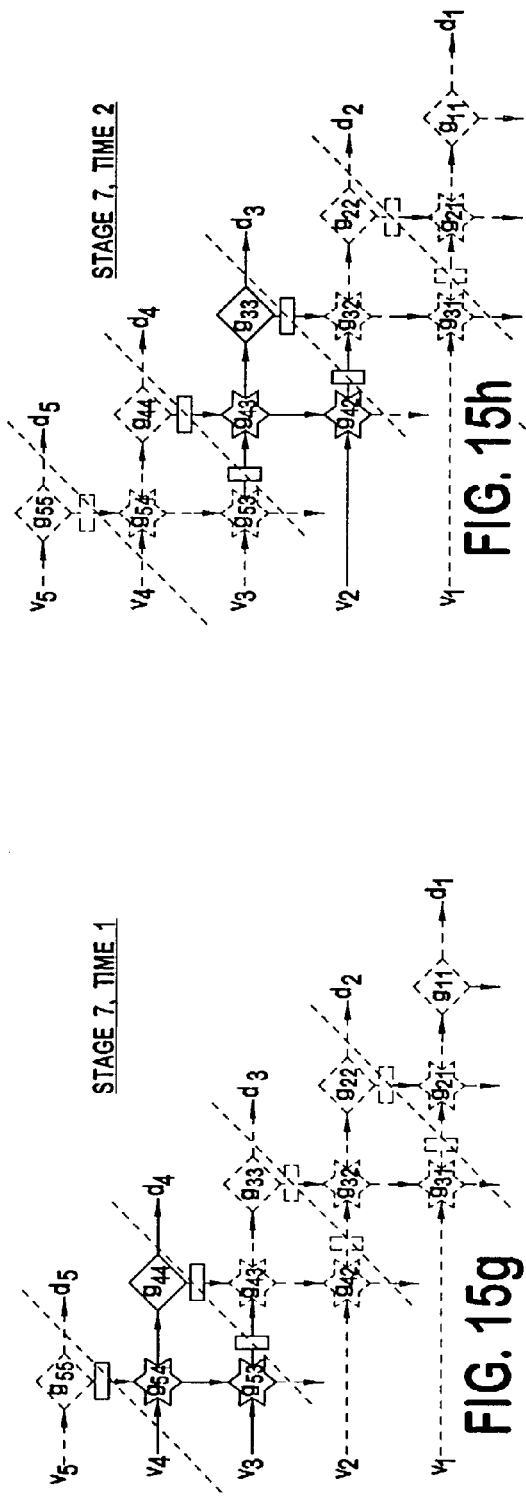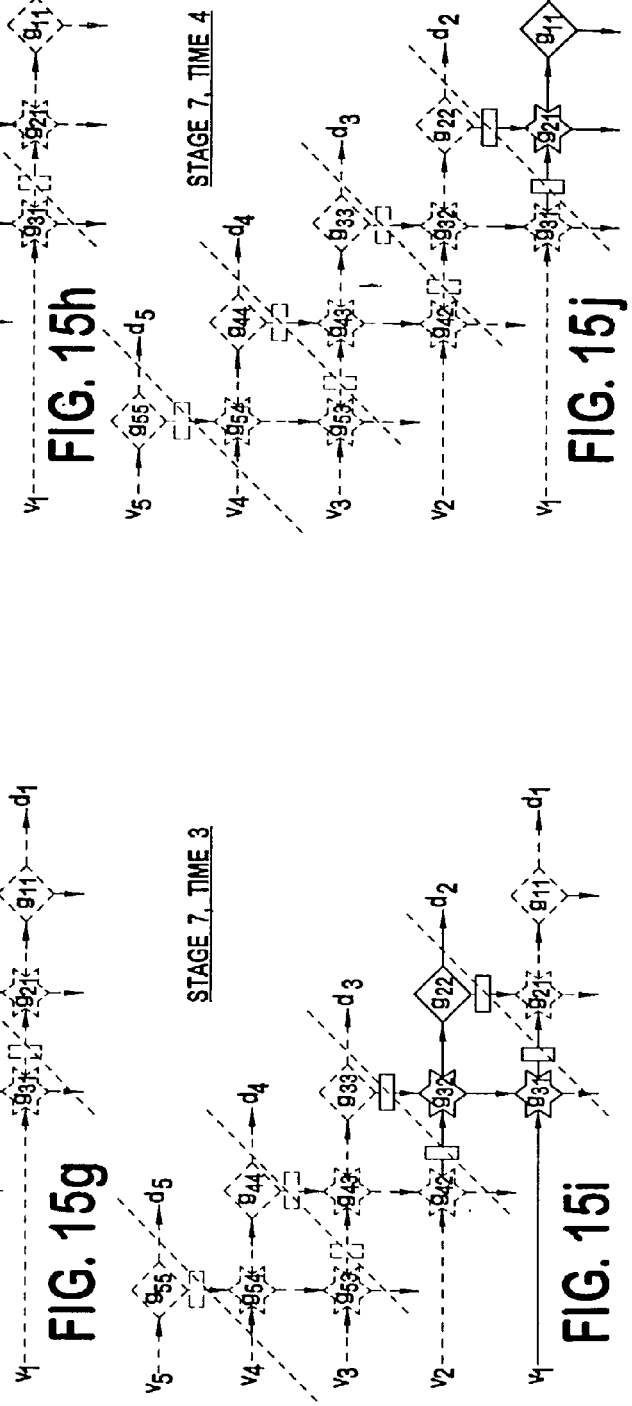

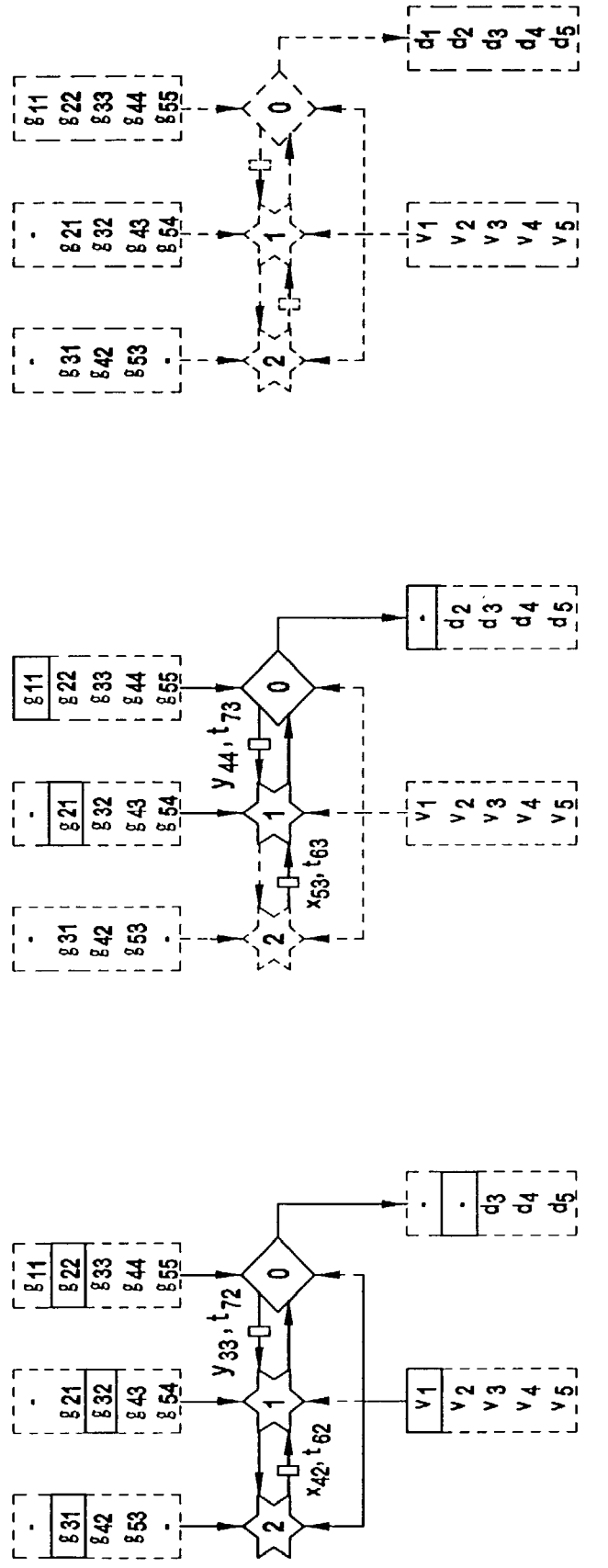

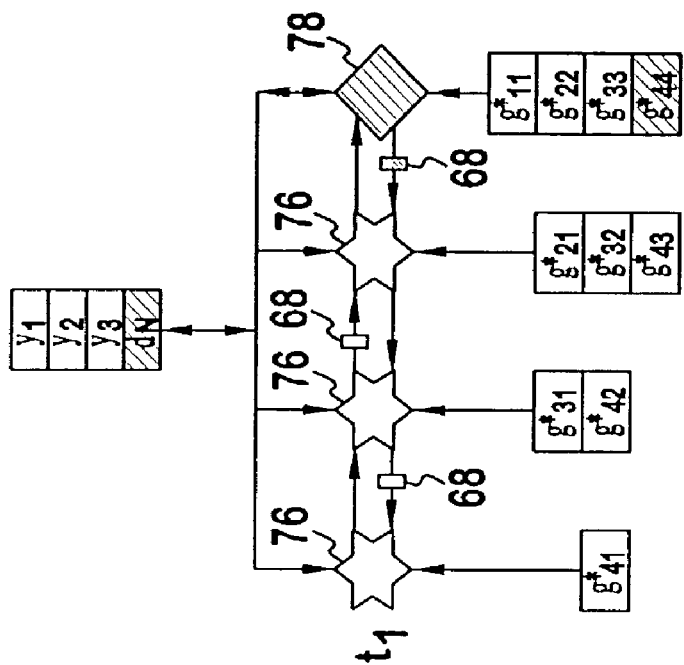
FIG. 17a
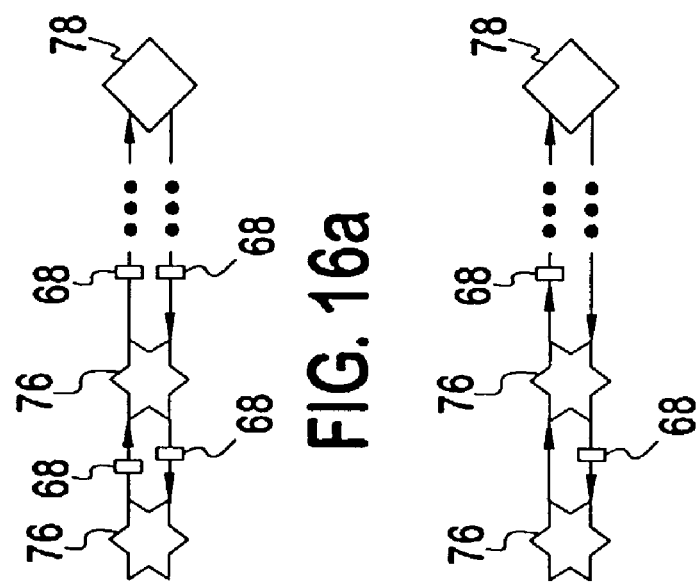
FIG. 16a
FIG. 16b

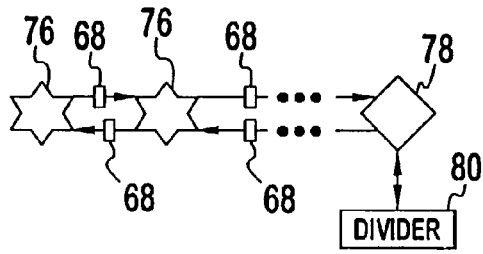
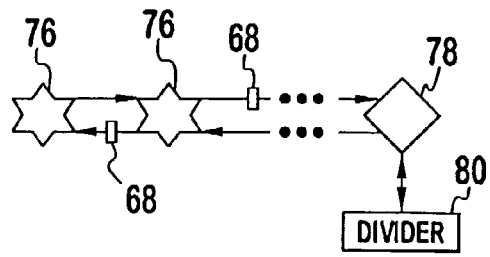
FIG. 18a  FIG. 18b
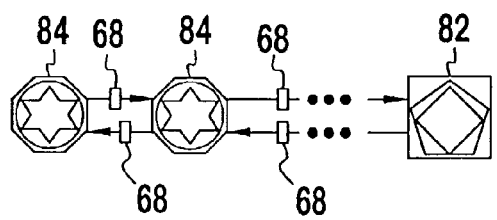
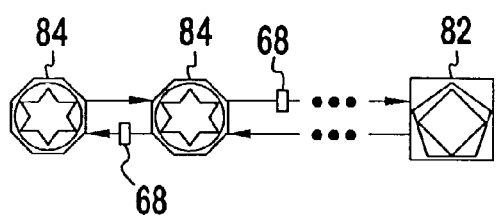
FIG. 19a  FIG. 19b
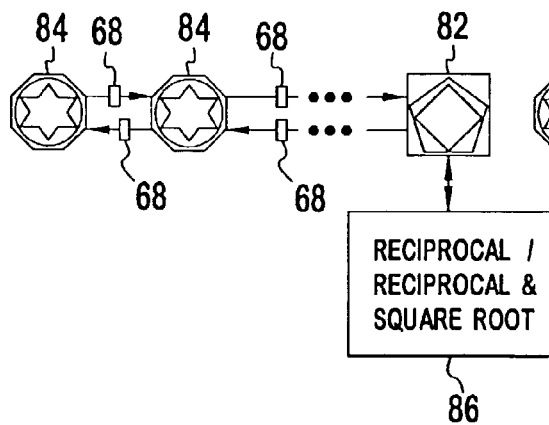
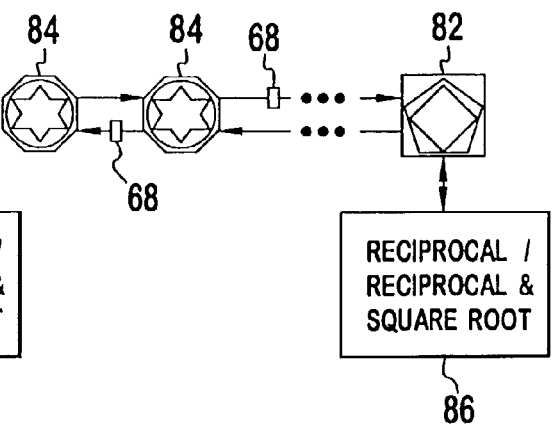
FIG. 20a  FIG. 20b

USER EQUIPMENT AND BASE STATION PERFORMING DATA DETECTION USING A SCALAR ARRAY

This application is a continuation-in-part of patent application Ser. No. 10/083,189, filed on Feb. 26, 2002, now abandoned which claims priority from U.S. Provisional Patent Application No. 60/332,950, filed on Nov. 14, 2001.

BACKGROUND

This invention generally relates to solving linear systems. In particular, the invention relates to using array processing to solve linear systems.

Linear system solutions are used to solve many engineering issues. One such issue is joint user detection of multiple user signals in a time division duplex (TDD) communication system using code division multiple access (CDMA). In such a system, multiple users send multiple communication bursts simultaneously in a same fixed duration time interval (timeslot). The multiple bursts are transmitted using different spreading codes. During transmission, each burst experiences a channel response. One approach to recover data from the transmitted bursts is joint detection, where all users data is received simultaneously. Such a system is shown in FIG. 1. The joint detection receiver may be used in a user equipment or base station.

The multiple bursts 90, after experiencing their channel response, are received as a combined received signal at an antenna 92 or antenna array. The received signal is reduced to baseband, such as by a demodulator 94, and sampled at a chip rate of the codes or a multiple of a chip rate of the codes, such as by an analog to digital converter (ADC) 96 or multiple ADCs, to produce a received vector, $\underline{r}$. A channel estimation device 98 uses a training sequence portion of the communication bursts to estimate the channel response of the bursts 90. A joint detection device 100 uses the estimated or known spreading codes of the users' bursts and the estimated or known channel responses to estimate the originally transmitted data for all the users as a data vector, $\underline{d}$.

The joint detection problem is typically modeled by Equation 1.

$$A\underline{d}+\underline{n}=\underline{r} \qquad \text{Equation 1}$$

$\underline{d}$ is the transmitted data vector; $\underline{r}$ is the received vector; $\underline{n}$ is the additive white gaussian noise (AWGN); and A is an M×N matrix constructed by convolving the channel responses with the known spreading codes.

Two approaches to solve Equation 1 is a zero forcing (ZF) and a minimum mean square error (MMSE) approach. A ZF solution, where $\underline{n}$ is approximated to zero, is per Equation 2.

$$\underline{d}=(A^H A)^{-1}A^H\underline{r} \qquad \text{(Equation 2)}$$

A MMSE approach is per Equations 3 and 4.

$$\underline{d}=R^{-1}A^H r \qquad \text{Equation 3}$$

$$R=A^H A+\sigma^2 I \qquad \text{Equation 4}$$

$\sigma^2$ is the variance of the noise, $\underline{n}$, and I is the identity matrix.

Since the spreading codes, channel responses and average of the noise variance are estimated or known and the received vector is known, the only unknown variable is the data vector, $\underline{d}$. A brute force type solution, such as a direct matrix inversion, to either approach is extremely complex. One technique to reduce the complexity is Cholesky decomposition. The Cholesky algorithm factors a symmetric positive definite matrix, such as $\tilde{A}$ or R, into a lower triangular matrix G and an upper triangular matrix $G^H$ by Equation 5.

$$\tilde{A} \text{ or } R = G\, G^H \qquad \text{Equation 5}$$

A symmetric positive definite matrix, $\tilde{A}$, can be created from A by multiplying A by its conjugate transpose (hermetian), $A^H$, per Equation 6.

$$\tilde{A}=A^H A \qquad \text{Equation 6}$$

For shorthand, $\tilde{r}$ is defined per Equation 7.

$$\tilde{r}=A^H\underline{r} \qquad \text{Equation 7}$$

As a result, Equation 1 is rewritten as Equations 8 for ZF or 9 for MMSE.

$$\tilde{A}\underline{d}=\tilde{r} \qquad \text{Equation 8}$$

$$R\underline{d}=\tilde{r} \qquad \text{Equation 9}$$

To solve either Equation 8 or 9, the Cholesky factor is used per Equation 10.

$$G\,G^H\underline{d}=\tilde{r} \qquad \text{Equation 10}$$

A variable y is defined as per Equation 11.

$$G^H\underline{d}=y \qquad \text{Equation 11}$$

Using variable y, Equation 10 is rewritten as Equation 12.

$$Gy=\tilde{r} \qquad \text{Equation 12}$$

The bulk of complexity for obtaining the data vector is performed in three steps. In the first step, G is created from the derived symmetric positive definite matrix, such as $\tilde{A}$ or R, as illustrated by Equation 13.

$$G=\text{CHOLESKY}(\tilde{A} \text{ or } R) \qquad \text{Equation 13}$$

Using G, y is solved using forward substitution of G in Equation 8, as illustrated by Equation 14.

$$y=\text{FORWARD SUB}(G, \tilde{r}) \qquad \text{Equation 14}$$

Using the conjugate transpose of G, $G^H$, $\underline{d}$ is solved using backward substitution in Equation 11, as illustrated by Equation 15.

$$\underline{d}=\text{BACKWARD SUB}(G^H, y) \qquad \text{Equation 15}$$

An approach to determine the Cholesky factor, G, per Equation 13 is the following algorithm, as shown for $\tilde{A}$ or R, although an analogous approach is used for R.

```
for i = 1 : N
    for j = max(1, i - P) : i - 1
        λ = min(j + P, N)
        a_I λ, I = a_I λ, I - a*_I, J · a_I λ, J;
    end for;
    λ = min(i + P, N)
    a_I λ, I = a_I λ, I /a_ii;
end for;
G = Ã or R;
```

$a_{d,e}$ denotes the element in matrix $\tilde{A}$ or R at row d, column e. ":" indicates a "to" operator, such as "from j to N," and $(\cdot)^H$ indicates a conjugate transpose (hermetian) operator.

Another approach to solve for the Cholesky factor uses N parallel vector-based processors. Each processor is mapped to a column of the $\tilde{A}$ or R matrix. Each processor's column is defined by a variable μ, where μ=1:N. The parallel processor based subroutine can be viewed as the following subroutine for μ=1:N.

```
j = 1
  while j < μ
    recv(g, N, left)
    if μ < N
      send(g_J N, right)
    end
    a_μ N ,μ = a_μ N ,μ - g*_μ g_μ.N
    j = j + 1
  end
  a_μ N ,μ = a_μ N ,μ / √a_μμ
  if μ < N
    send(a_μ · N ,μ, right)
  end
``` recv(·, left) is a receive from the left processor operator; send(·, right) is a send to the right processor operator; and $g_{K,L}$ is a value from a neighboring processor.

This subroutine is illustrated using FIGS. 2a–2h. FIG. 2a is a block diagram of the vector processors and associated memory cells of the joint detection device. Each processor $50_1$ to $50_N$ (50) operates on a column of the matrix. Since the G matrix is lower triangular and Ã or R is completely defined by is lower triangular portion, only the lower triangular elements, $a_{k,1}$ are used.

FIGS. 2b and 2c show two possible functions performed by the processors on the cells below them. In FIG. 2b, the pointed down triangle function 52 performs Equations 16 and 17 on the cells ($a_{\mu\mu}$ to $a_{N\mu}$) below that μ processor 50.

$$v \leftarrow a_{\mu N,\mu}/\sqrt{a_{\mu\mu}}$$  Equation 16

$$a_{\mu:N,\mu} := v$$  Equation 17

"←" indicates a concurrent assignment; ":=" indicates a sequential assignment; and v is a value sent to the right processor.

In FIG. 2c, the pointed right triangle function 52 performs Equations 18 and 19 on the cells below that μ processor 50.

$$v \leftarrow u$$  Equation 18

$$a_{\mu:N,\mu'} := a_{\mu N,\mu} - v_\mu v_{\mu N}$$  Equation 19

$v_k$ indicates a value associated with a right value of the $k^{th}$ processor 50.

FIGS. 2d–2g illustrate the data flow and functions performed for a 4×4 G matrix. As shown in the FIGS. 2d–2g for each stage 1 through 4 of processing, the left most processor 50 drops out and the pointed down triangular function 52 moves left to right. To implement FIGS. 2d–2g, the pointed down triangle can physically replace the processor to the right or virtually replace the processor to the right by taking on the function of the pointed down triangle.

These elements are extendable to an N×N matrix and N processors 50 by adding processors 50 (N—4 in number) to the right of the fourth processor $50_4$ and by adding cells of the bottom matrix diagonal (N—4 in number) to each of the processors 50 as shown in FIG. 2h for stage 1. The processing in such an arrangement occurs over N stages.

The implementation of such a Cholesky decomposition using either vector processors or a direct decomposition into scalar processors is inefficient, because large amounts of processing resources go idle after each stage of processing.

Accordingly, it is desirable to have alternate approaches to solve linear systems.

SUMMARY

A user equipment or base station recovers data from a plurality of data signals received as a received vector. The user equipment determines data of the received vector by determining a Cholesky factor of an N by N matrix and using the determined Cholesky factor in forward and backward substitution to determine data of the received data signals. The user equipment or base station comprises an array of at most N scalar processing elements. The array has input for receiving elements from the N by N matrix and the received vector. Each scalar processing element is used in determining the Cholesky factor and performs forward and backward substitution. The array outputs data of the received vector.

BRIEF DESCRIPTION OF THE DRAWING(S)

FIGS. 3a and 3b are preferred embodiments of N scalar processors performing Cholesky decomposition.

FIGS. 4a–4e are diagrams illustrating an example of using a three dimensional graph for Cholesky decomposition.

FIGS. 6a–6j for a non-banded and FIGS. 6e–6j for a banded matrix are diagrams illustrating the processing flow of the scalar array.

Figure 7:
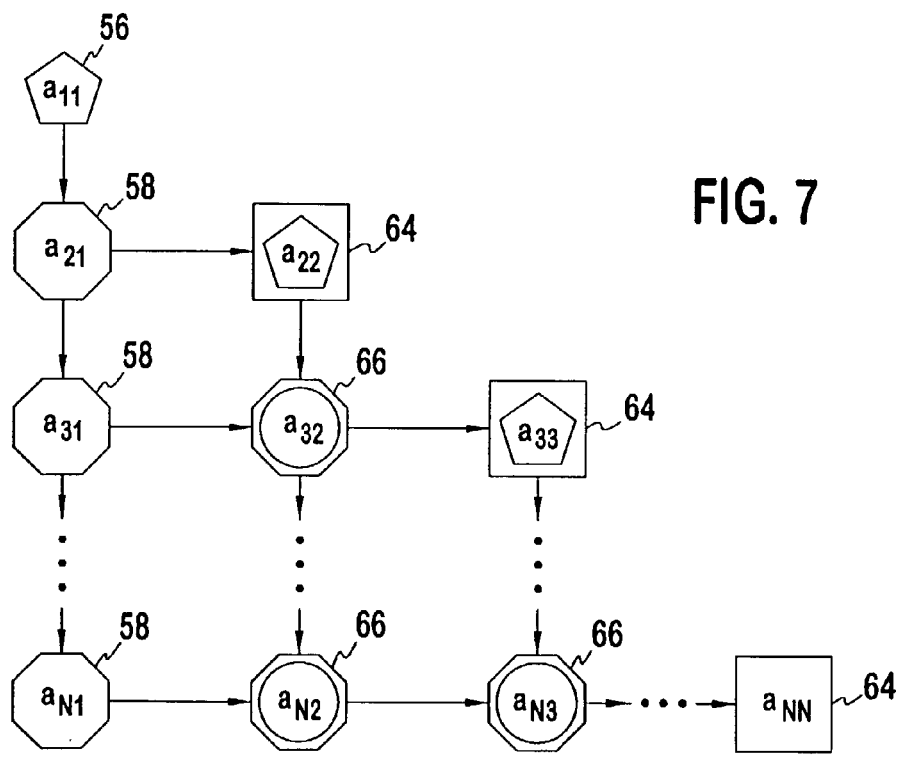

FIG. 7 is a diagram extending a projection of FIG. 4a along the k axis to an N×N matrix.

FIGS. 8a–8d are diagrams illustrating the processing flow using delays between the scalar processors in the 2D scalar array.

Figure 8A:
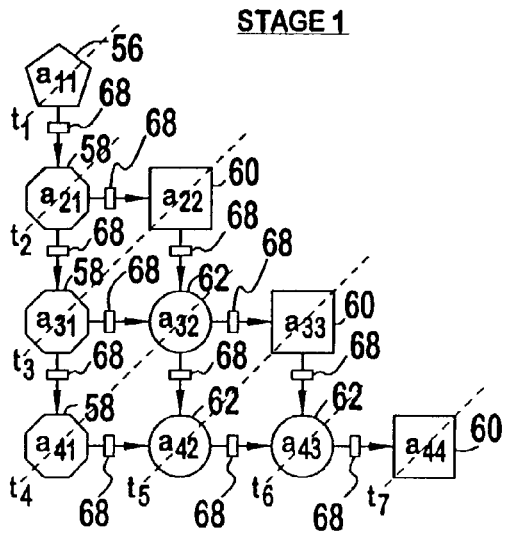
Figure 8B:
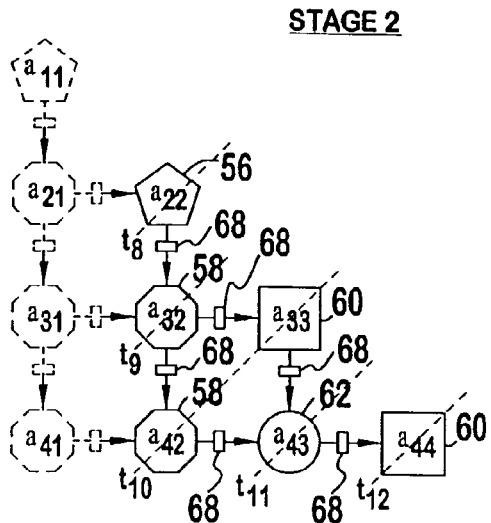
Figure 8C:
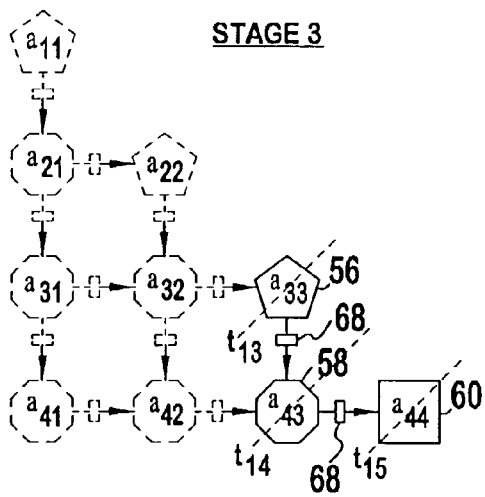
Figure 8D:
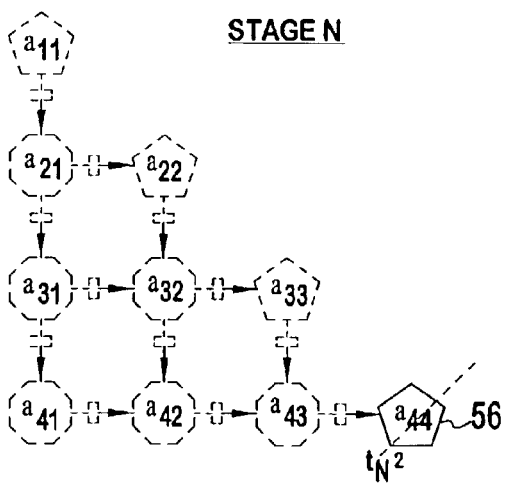
Figure 8E:
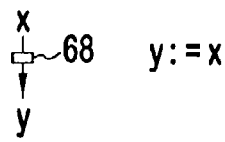

FIG. 8e is a diagram of a delay element and its associated equation.

Figure 9C:
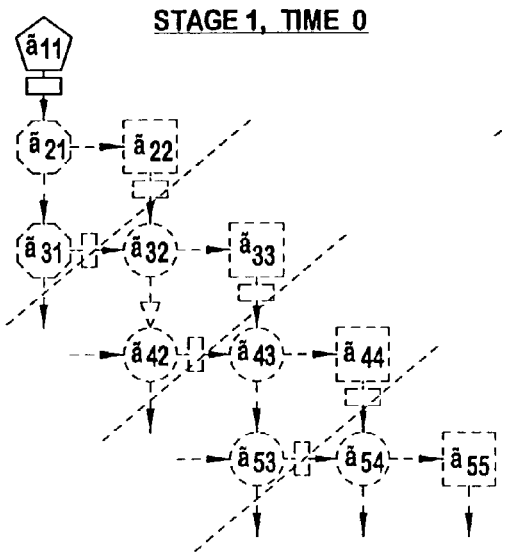
Figure 9D:
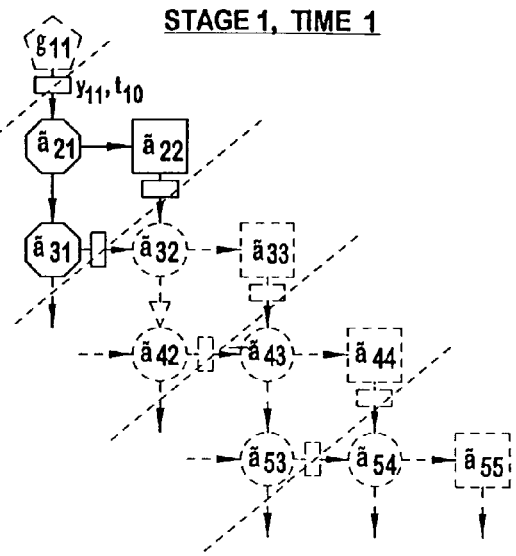
Figure 9E:
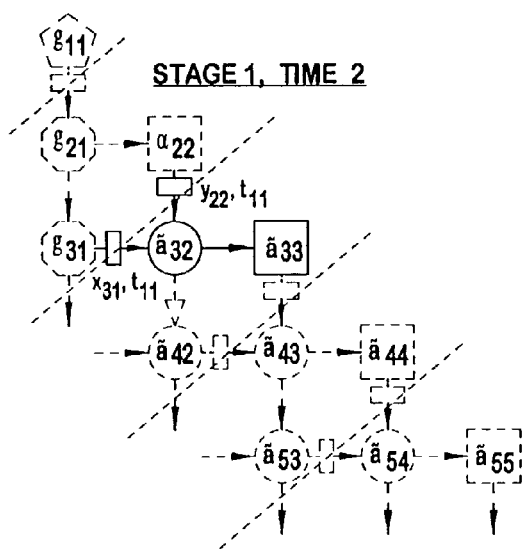
Figure 9F:
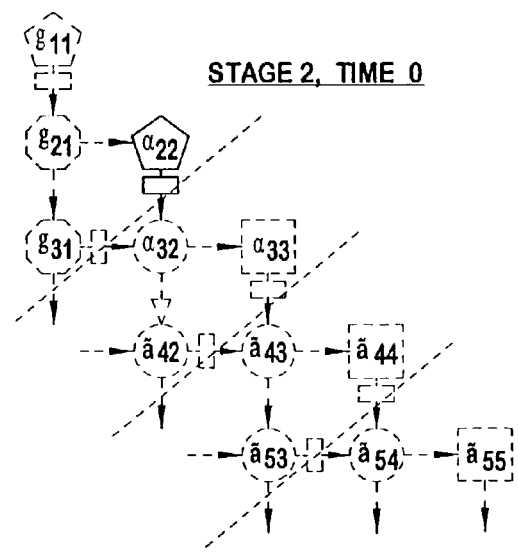
Figure 9G:
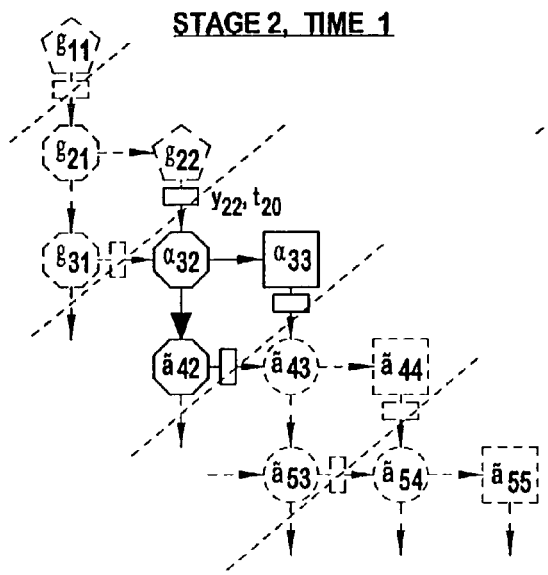
Figure 9H:
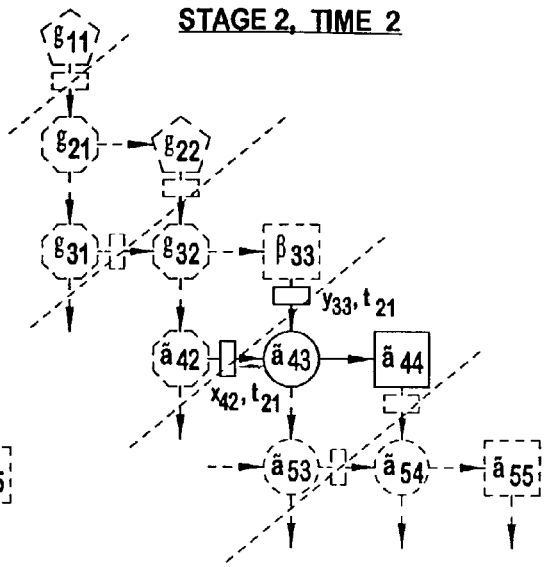
Figure 9I:
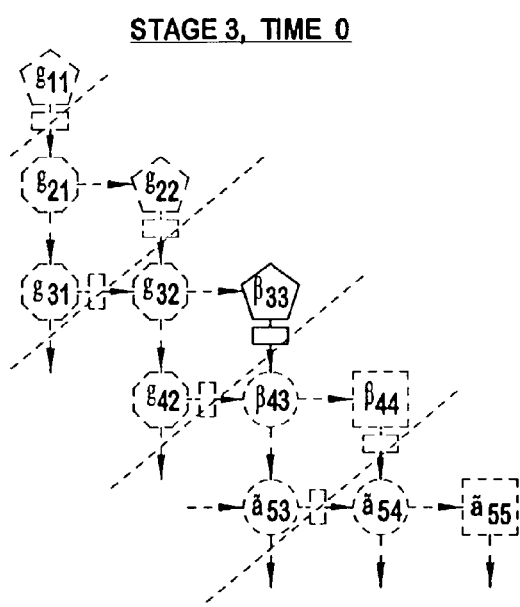
Figure 9J:
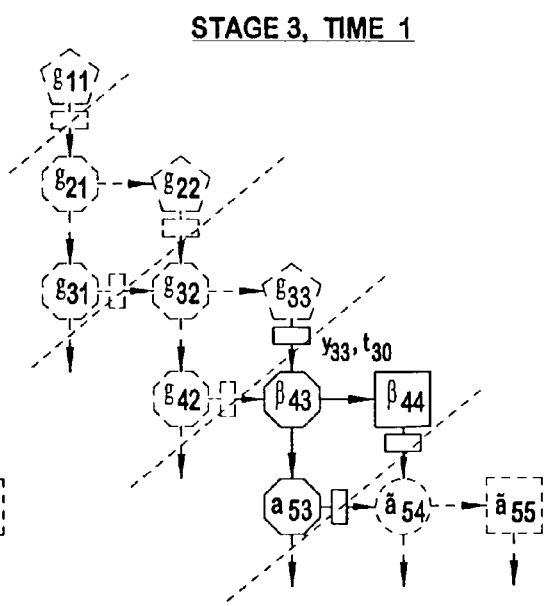
Figure 9K:
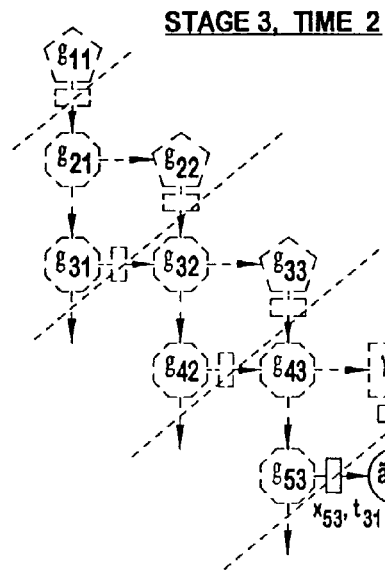
Figure 9L:
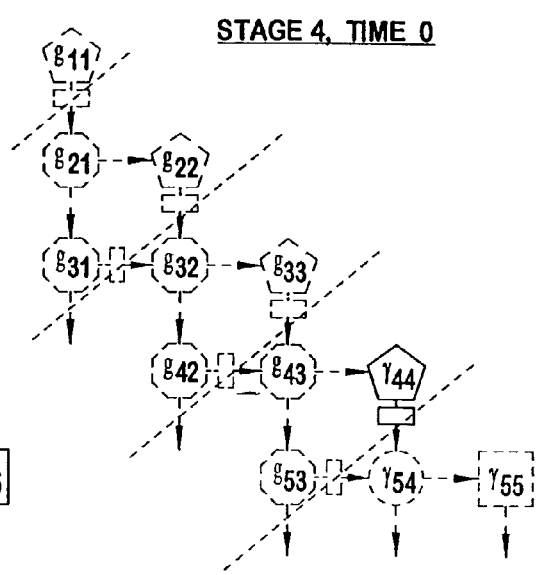
Figure 9M:
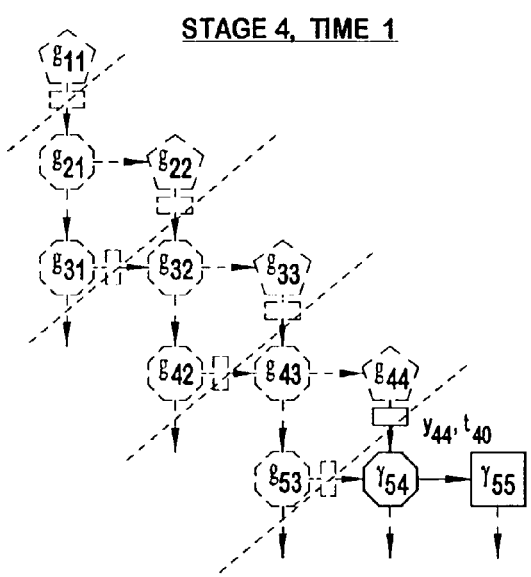
Figure 9N:
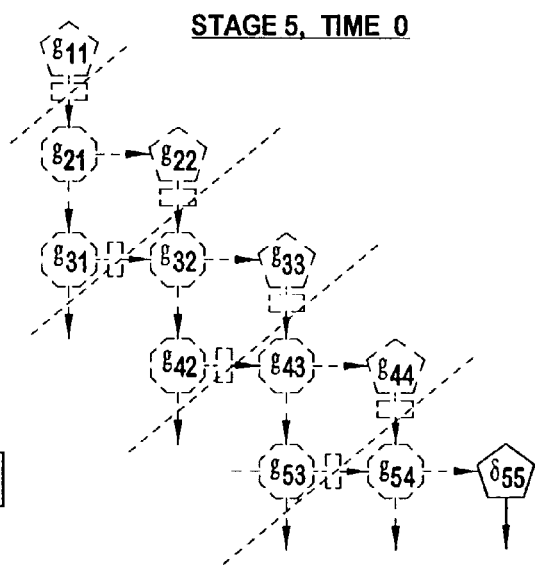
Figure 9O:
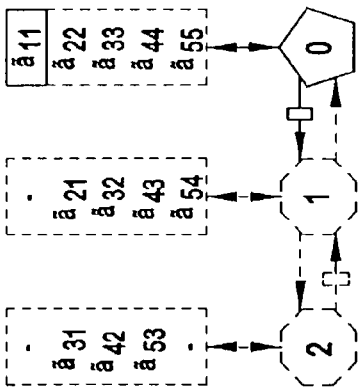
Figure 9P:
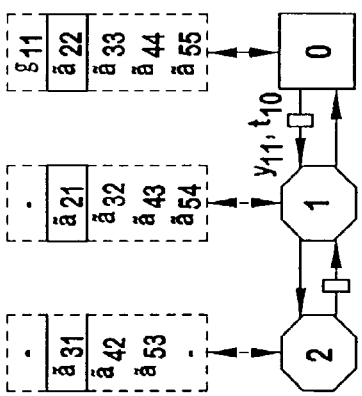
Figure 9Q:
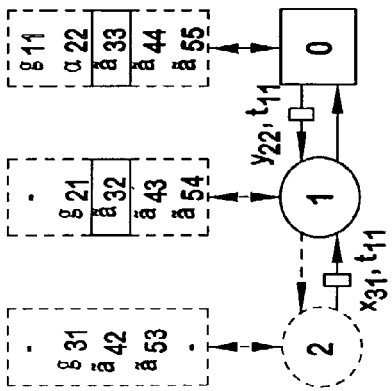
Figure 9R:
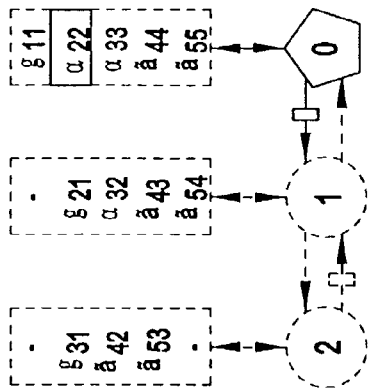
Figure 9S:
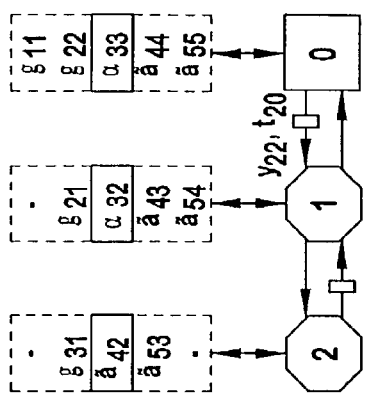
Figure 9T:
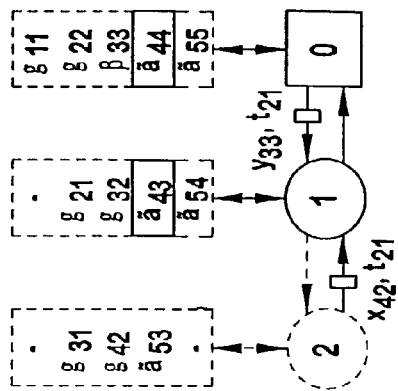

FIG. 9a illustrates projecting the scalar processor array of FIGS. 8a–8d onto a 1D array of four scalar processors.

FIG. 9b illustrates projecting a scalar processing array having delays between every other processor onto a 1 D array of four scalar processors.

FIGS. 9c–9n are diagrams illustrating the processing flow for Cholesky decomposition of a banded matrix having delays between every other processor.

FIGS. 9o–9z illustrate the memory access for a linear array processing a banded matrix.

Figure 10A:
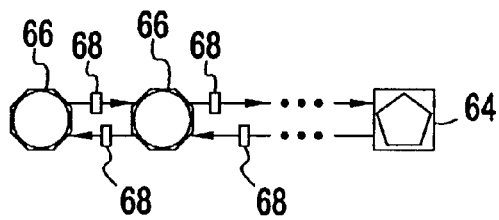
Figure 10B:
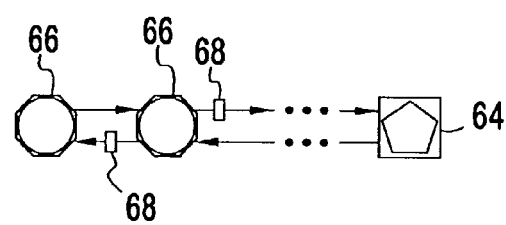

FIGS. 10a and 10b are the projected arrays of FIGS. 9a and 9b extended to N scalar processors.

Figure 11A:
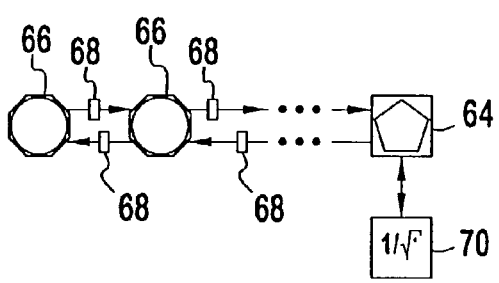
Figure 11B:
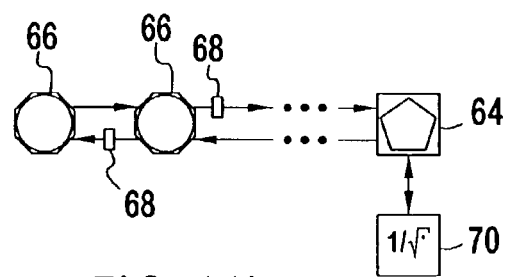

FIGS. 11a and 11b illustrate separating a divide/square root function from the arrays of FIGS. 10a and 10b.

Figure 12B:
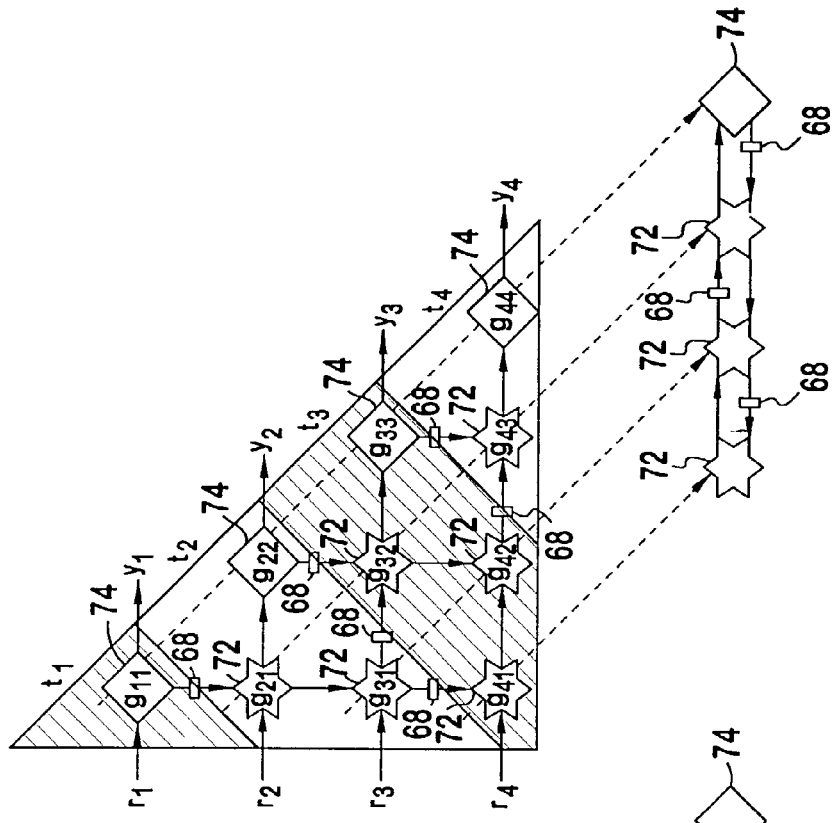
Figure 12A:
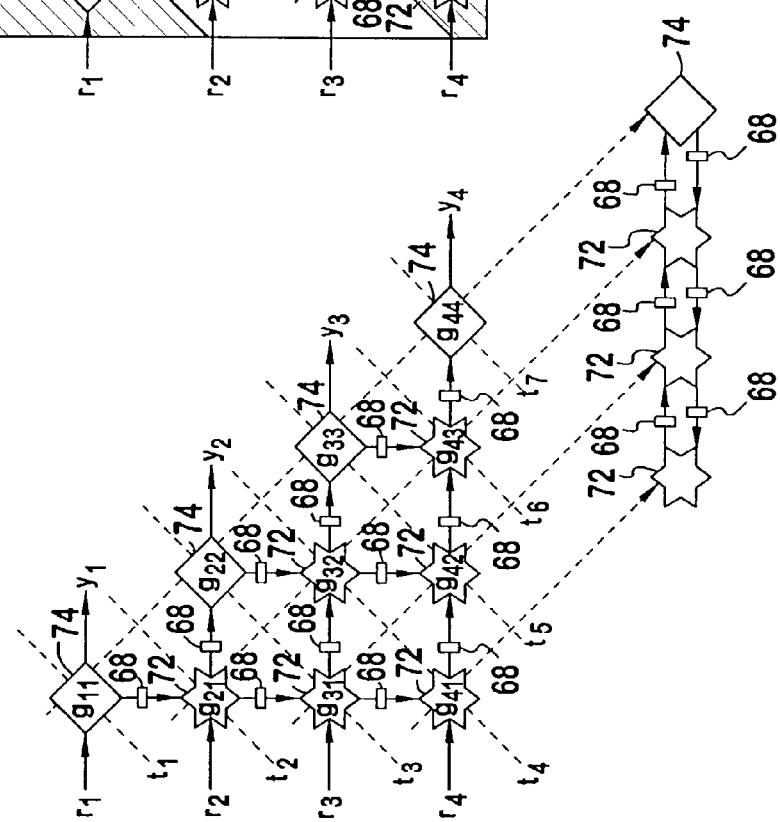
Figure 12M:
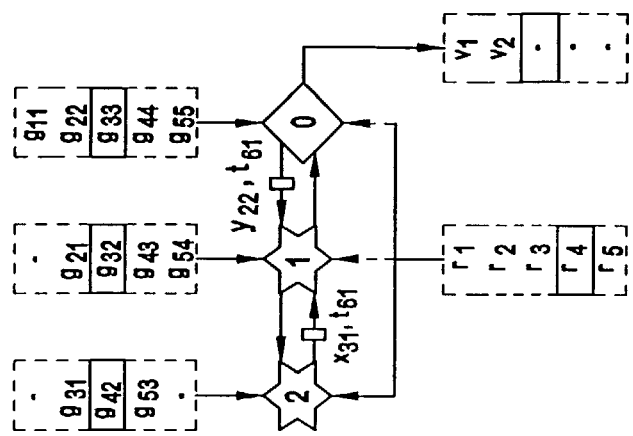
Figure 12L:
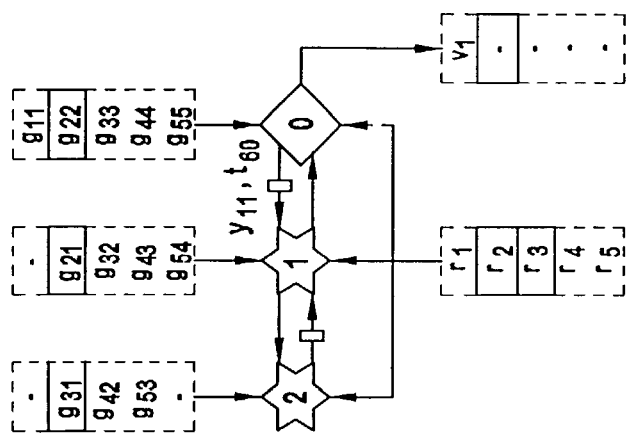
Figure 12K:
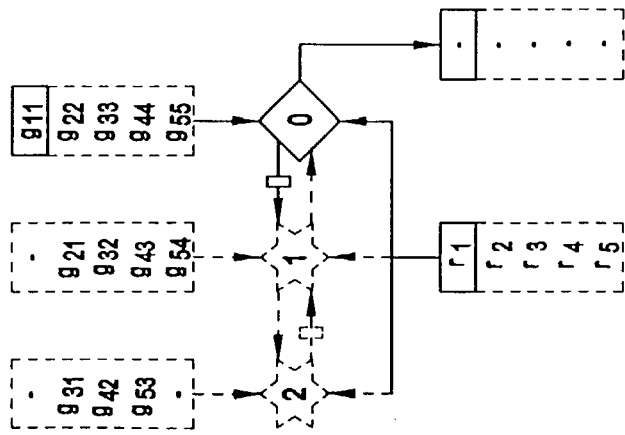

FIG. 12a is an illustration of projecting a forward substitution array having delays between each processor onto four scalar processors.

FIG. 12b is an illustration of projecting a forward substitution array having delays between every other processor onto four scalar processors.

FIGS. 12c and 12d are diagrams showing the equations performed by a star and diamond function for forward substitution.

FIG. 12*e* is a diagram illustrating the processing flow for a forward substitution of a banded matrix having concurrent assignments between every other processor.

FIGS. 12*f*–12*j* are diagrams illustrating the processing flow for forward substitution of a banded matrix having delays between every other processor.

FIGS. 12*k*–12*p* are diagrams illustrating the memory access for a forward substitution linear array processing a banded matrix.

FIGS. 13*a* and 13*b* are the projected arrays of FIGS. 12*a* and 12*b* extended to N scalar processors.

FIGS. 14*a*–14*d* are diagrams illustrating the processing flow of the projected array of FIG. 12*b*.

Figure 15B:
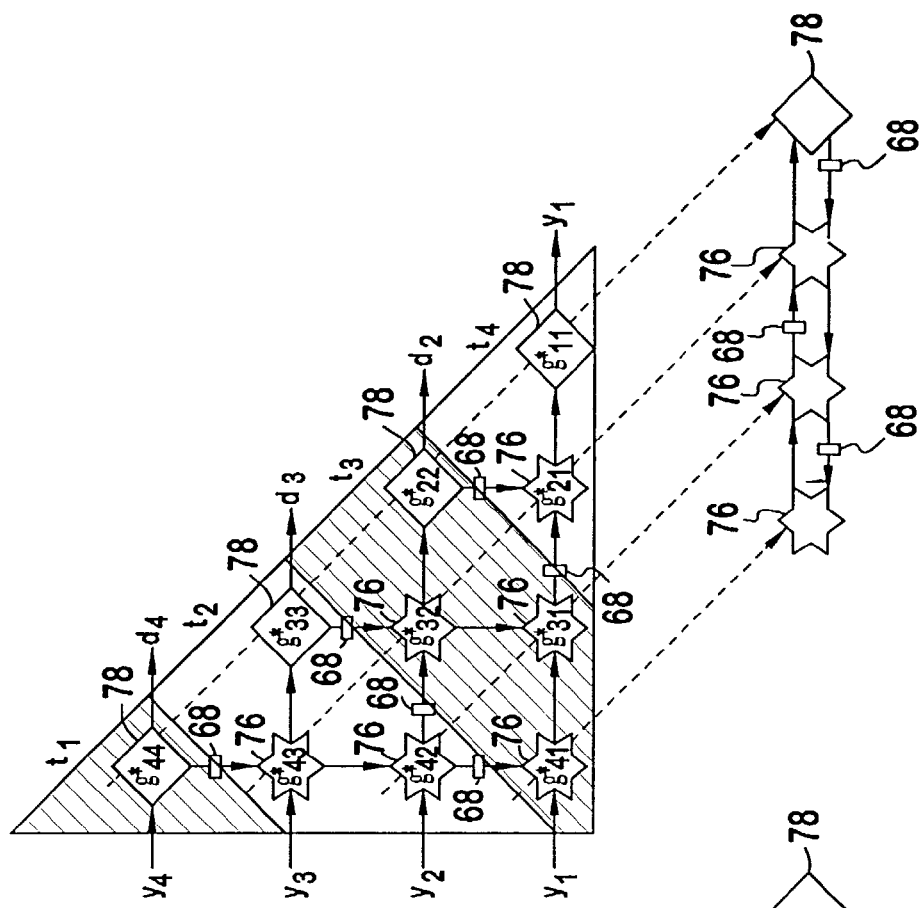
Figure 15A:
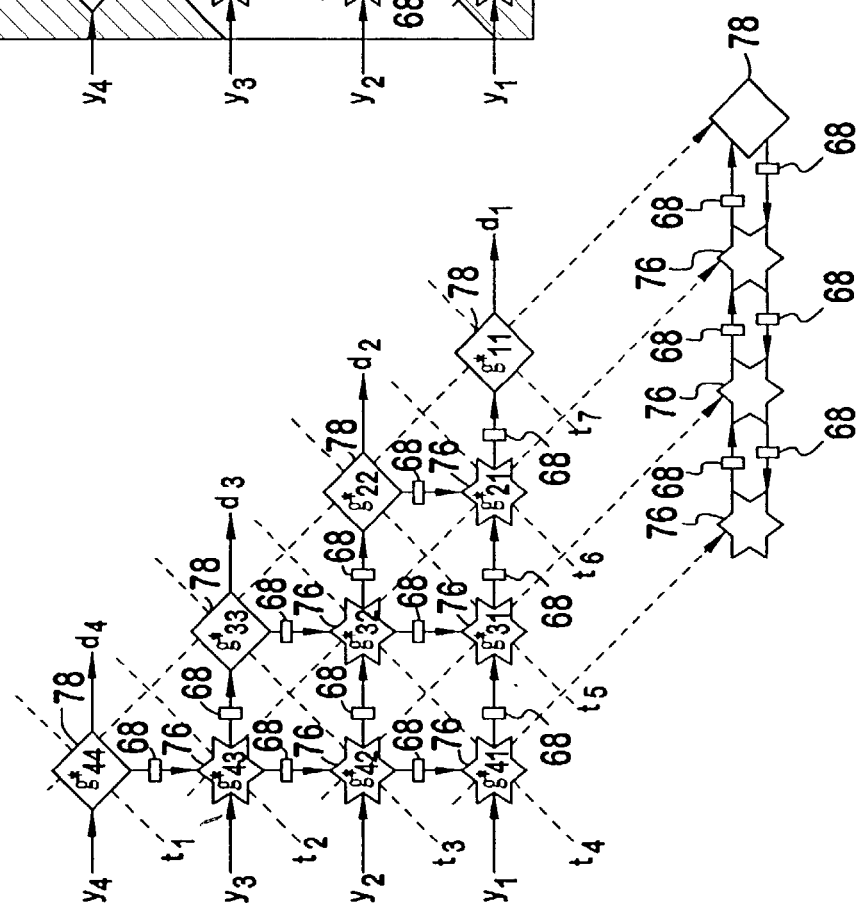
Figure 15M:
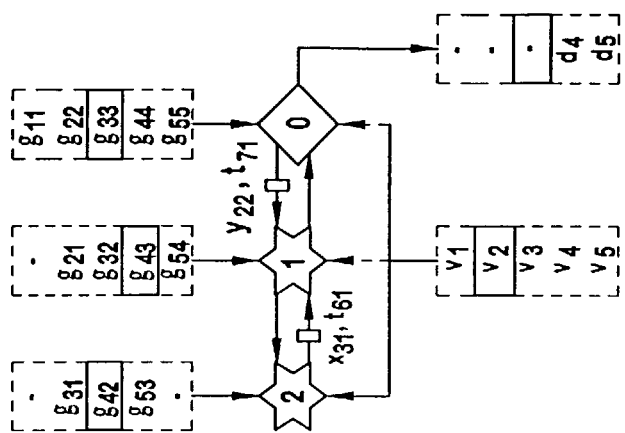
Figure 15L:
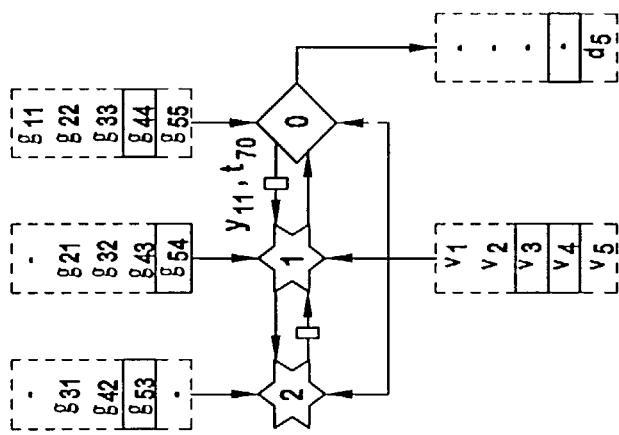
Figure 15K:
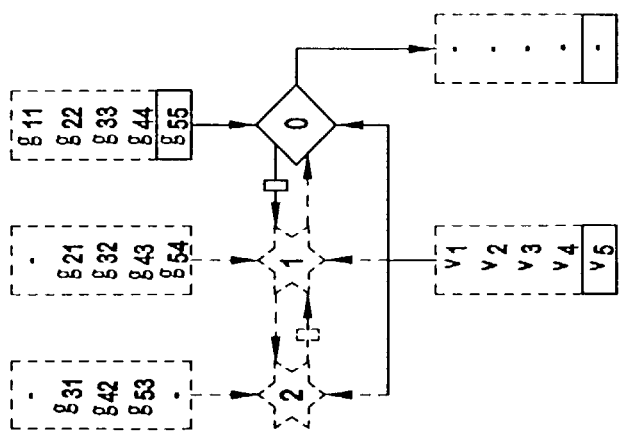
Figure 17D:
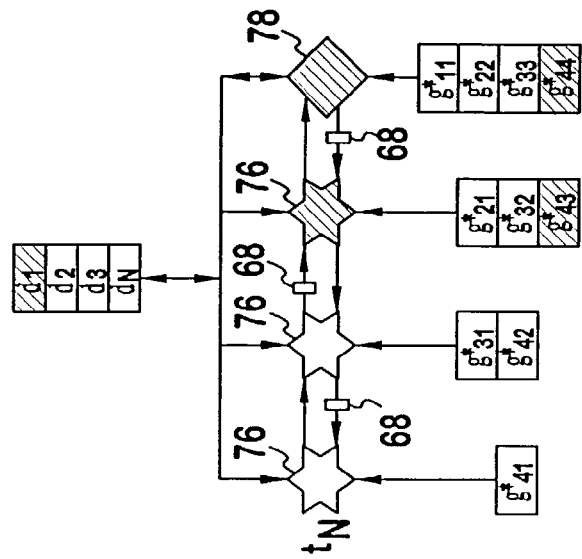
Figure 17C:
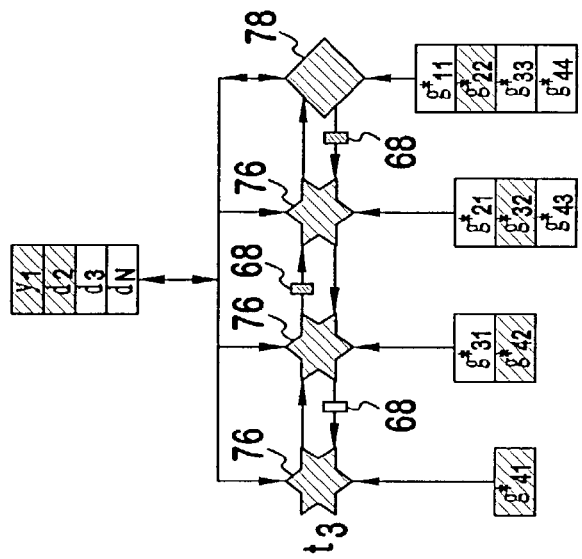
Figure 17B:
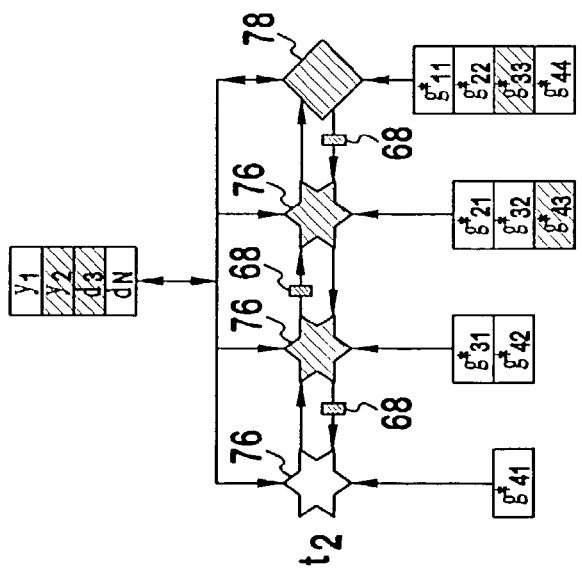

FIG. 15*a* is an illustration of projecting a backward substitution array having delays between each processor onto four scalar processors.

FIG. 15*b* is an illustration of projecting a backward substitution array having delays between every other processor onto four scalar processors.

FIGS. 15*c* and 15*d* are diagrams showing the equations performed by a star and diamond function for backward substitution.

FIG. 15*e* is a diagram illustrating the processing flow for backward substitution of a banded matrix having concurrent assignments between every other processor.

FIGS. 15*f*–15*j* are diagrams illustrating the processing flow for backward substitution of a banded matrix having delays between every other processor.

FIGS. 15*k*–15*p* are diagrams illustrating the memory access for a backward substitution linear array processing a banded matrix.

FIGS. 16*a* and 16*b* are the projected arrays of FIGS. 15*a* and 15*b* extended to N scalar processors.

FIGS. 17*a*–17*d* are diagrams illustrating the processing flow of the projected array of FIG. 15*b*.

FIGS. 18*a* and 18*b* are the arrays of FIGS. 13*a*, 13*b*, 16*a* and 16*b* with the division function separated.

FIGS. 19*a* and 19*b* are diagrams of a reconfigurable array for determining G, forward and backward substitution.

FIGS. 20*a* and 20*b* are illustrations of breaking out the divide and square root function from the reconfigurable array.

Figure 21A:
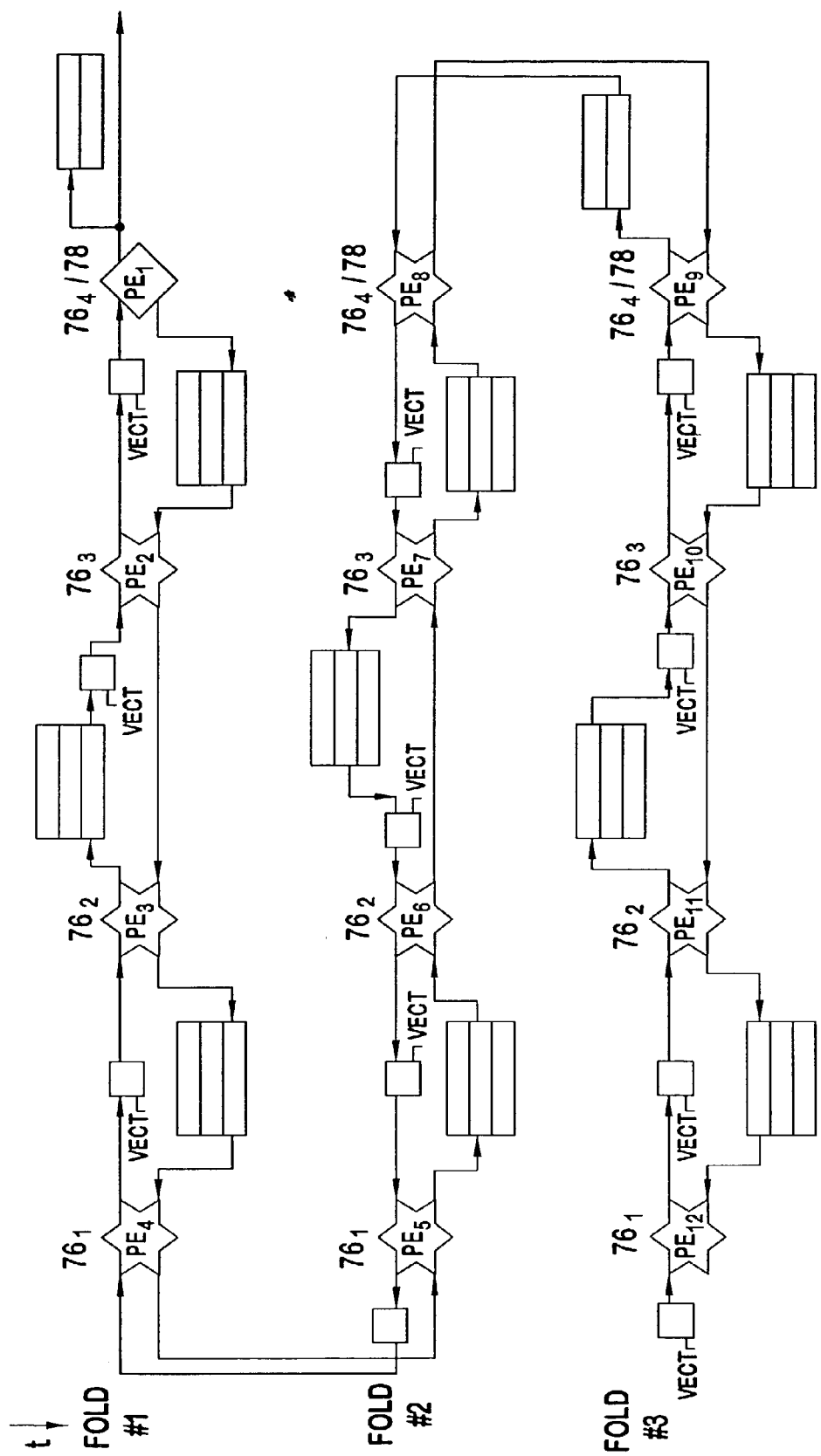

FIG. 21*a* illustrates bi-directional folding.

Figure 21B:
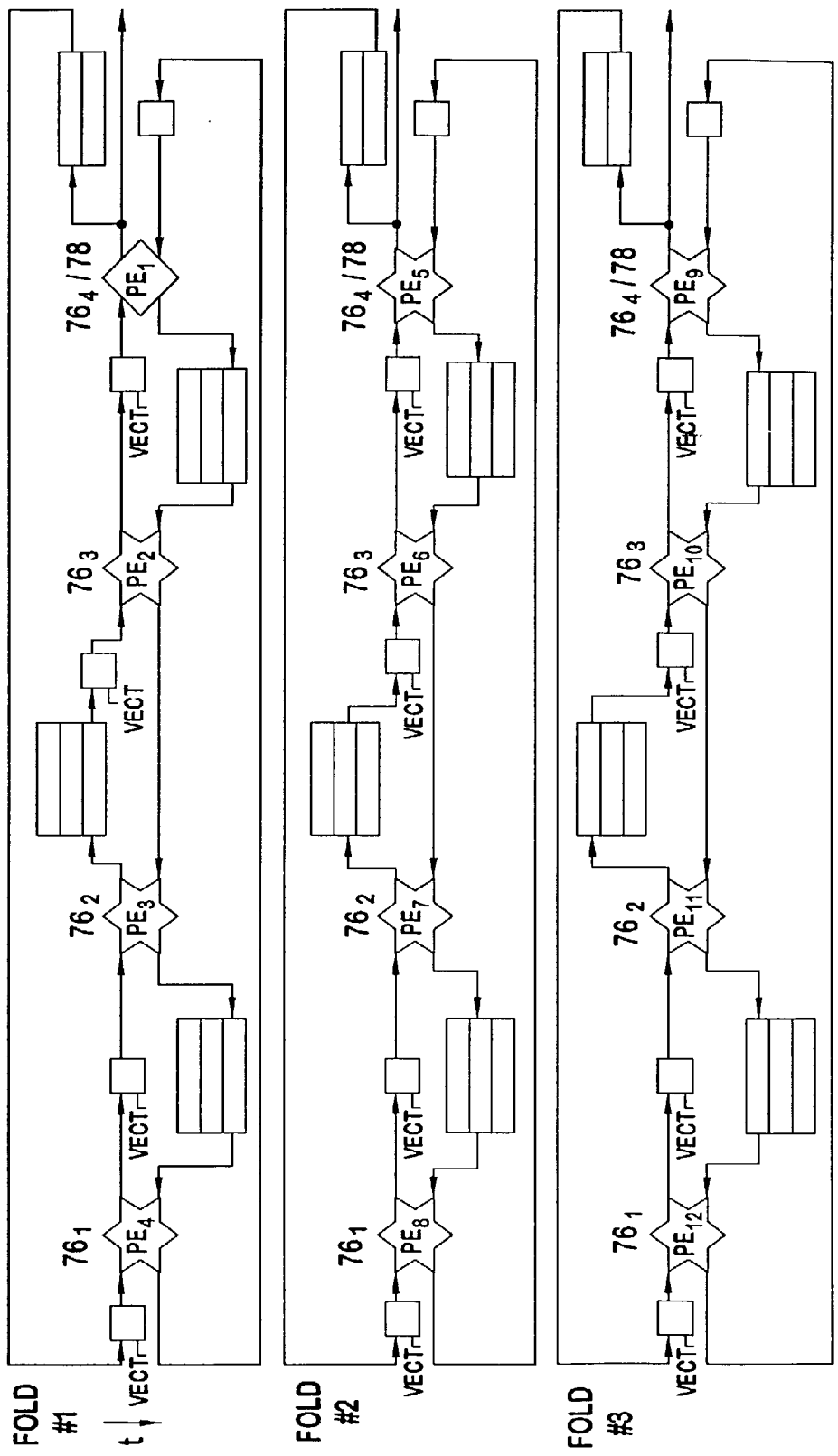

FIG. 21*b* illustrates one directional folding.

Figure 22A:
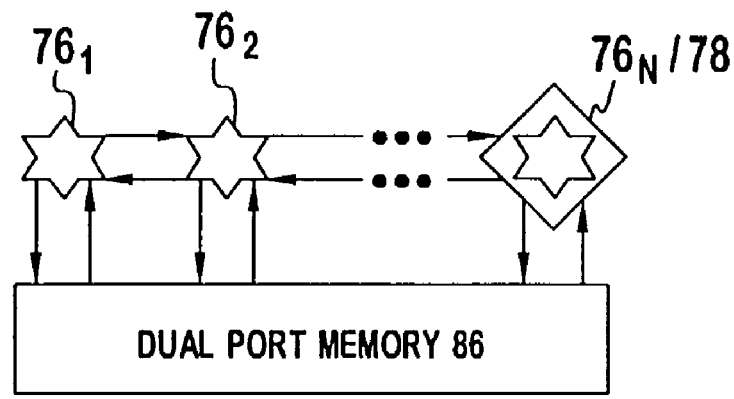

FIG. 22*a* is an implementation of bi-directional folding using N processors.

Figure 22B:
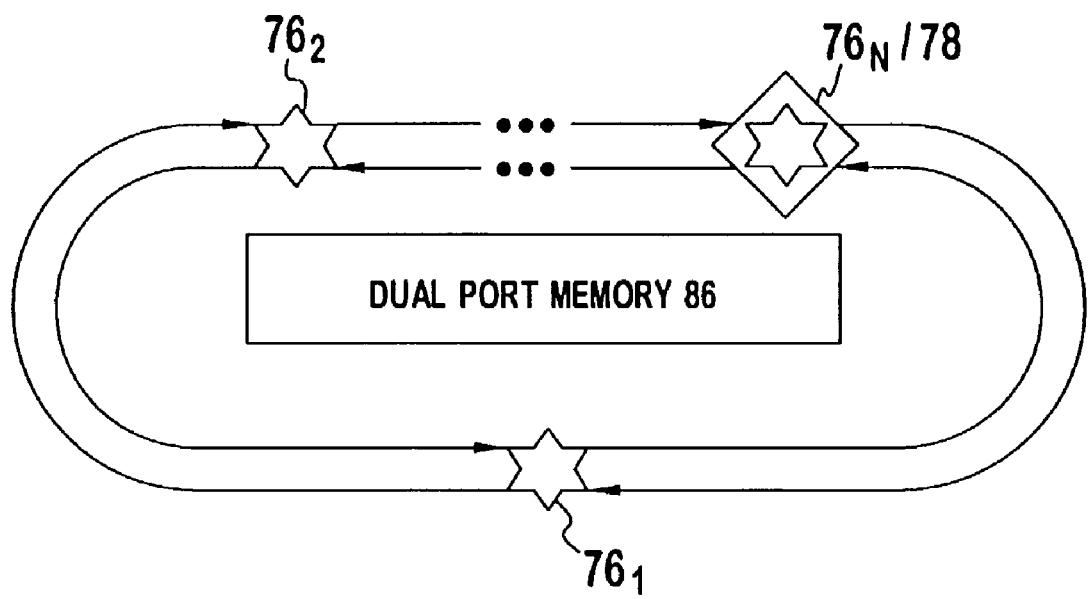

FIG. 22*b* is an implementation of one direction folding using N processors.

Figure 23:
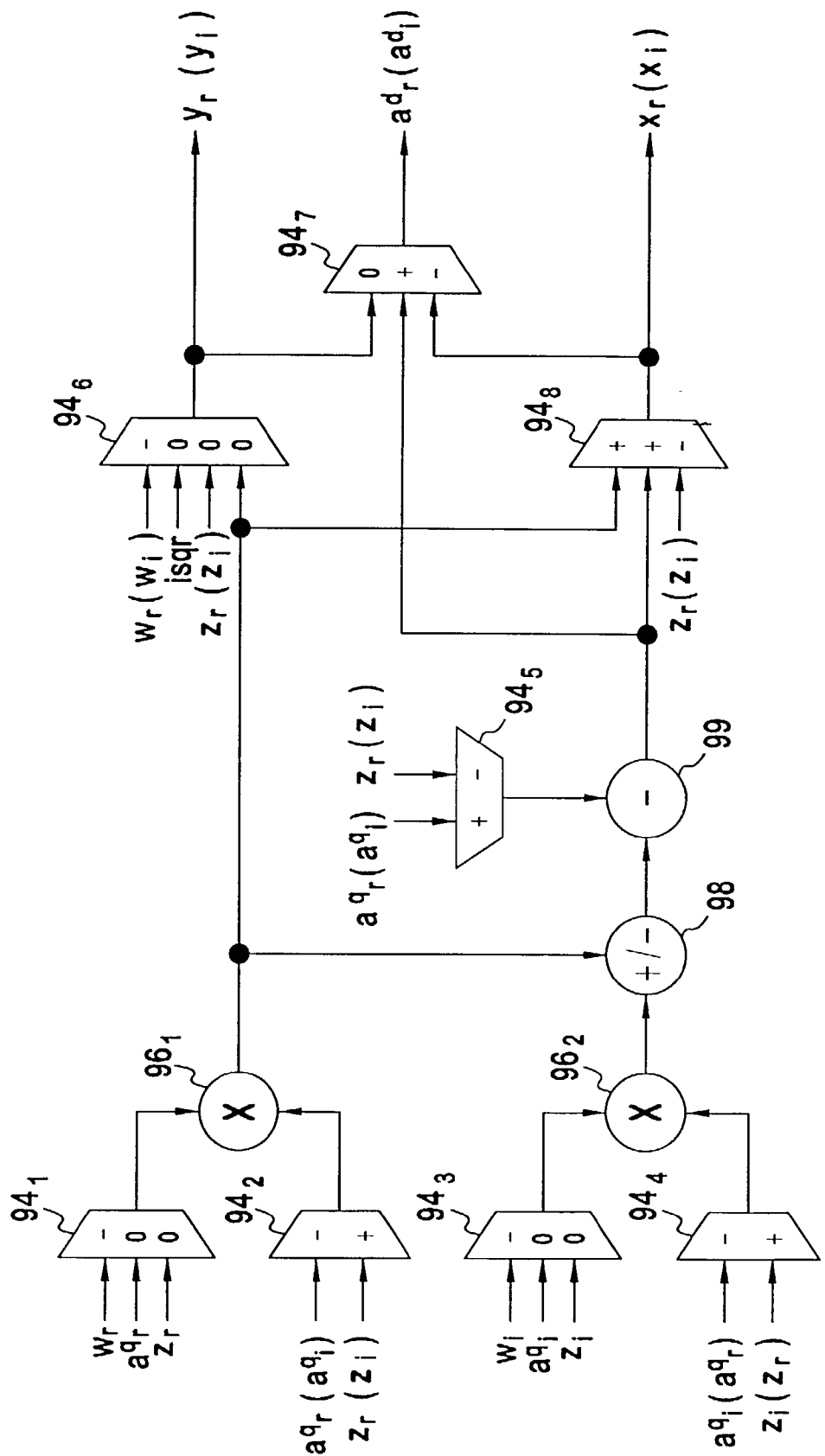

FIG. 23 is a preferred slice of a simple reconfigurable processing element.

DETAILED DESCRIPTION OF THE PREFERRED EMBODIMENTS

FIGS. 3*a* and 3*b* are preferred embodiments of N scalar processors $54_1$ to $54_N$ (54) performing Cholesky decomposition to obtain G. For simplicity, the explanation and description is explained for a 4×4 G matrix, although this approach is extendable to any N×N G matrix as shown in FIGS. 3*a* and 3*b*.

Figure 1:
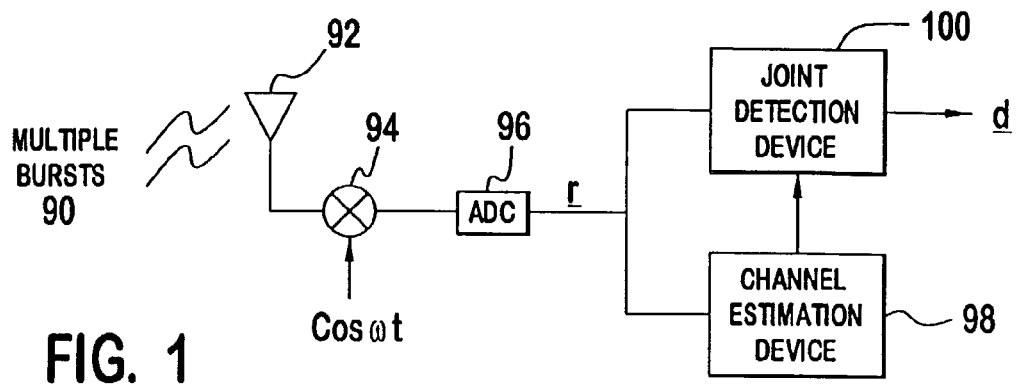
FIG. 1 is a simplified diagram of a joint detection receiver.
Figure 2A:
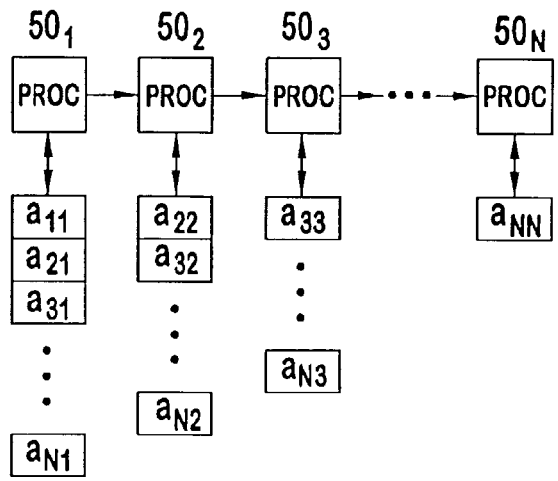
FIGS. 2a–2h are diagrams illustrating determining a Cholesky factor using vector processors.
Figure 2B:
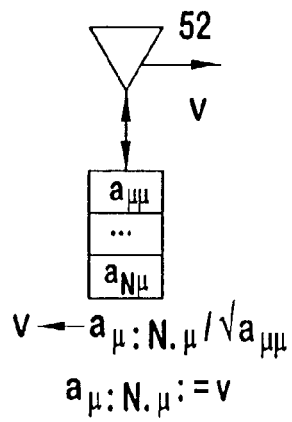
Figure 2C:
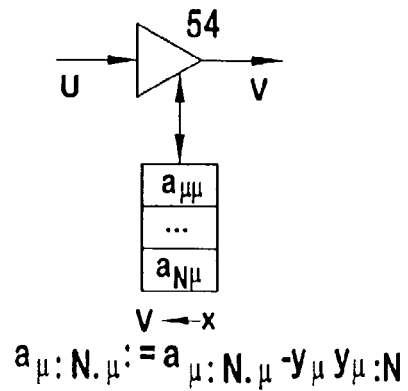
Figure 2D:
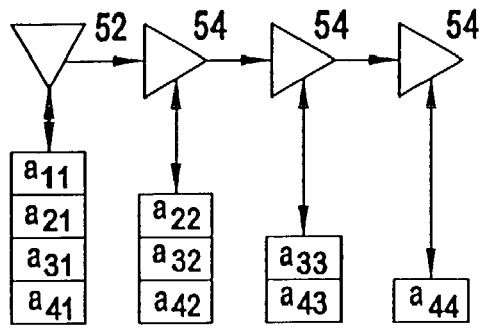
Figure 2E:
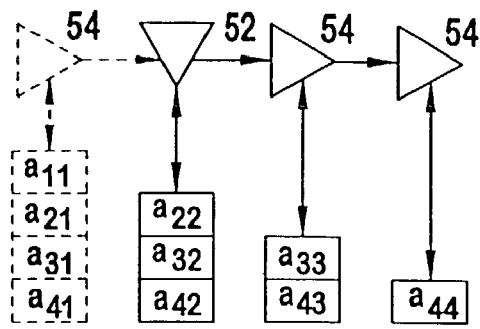
Figure 2F:
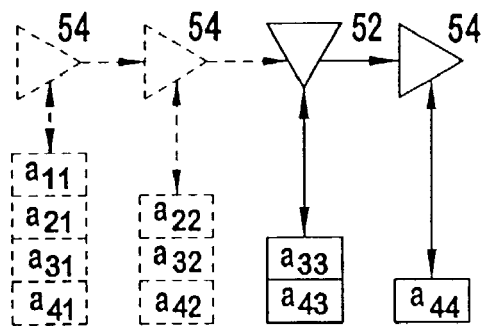
Figure 2G:
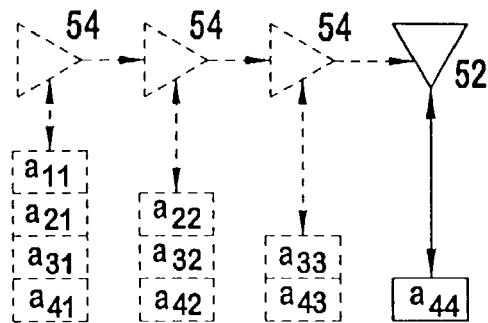
Figure 2H:
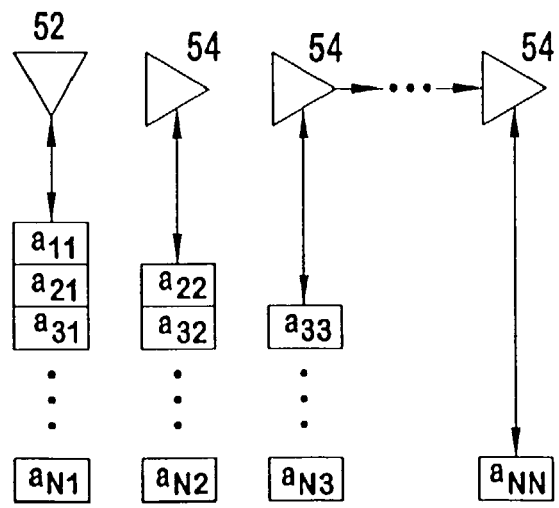
Figure 4B:
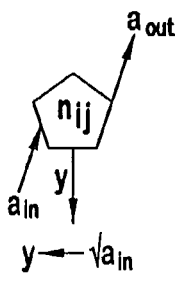

FIG. 4*a* illustrates a three-dimensional computational dependency graph for performing the previous algorithms. For simplicity, FIG. 4*a* illustrates processing a 5 by 5 matrix with a bandwidth of 3. The functions performed by each node are shown in FIGS. 4*b*–4*e*. The pentagon function of FIG. 4*b* performs Equations 20 and 21.

$$y \leftarrow \sqrt{a_{in}} \qquad \text{Equation 20}$$

$$a_{out} \leftarrow y \qquad \text{Equation 21}$$

← indicate a concurrent assignment. $a_{in}$ is input to the node from a lower level and $a_{out}$ is output to a higher level. FIG. 4*c* is a square function performing Equations 22 and 23.

$$y \leftarrow z^* \qquad \text{Equation 22}$$

$$a_{out} \leftarrow a_{in} - |z|^2 \qquad \text{Equation 23}$$

Figure 4D:
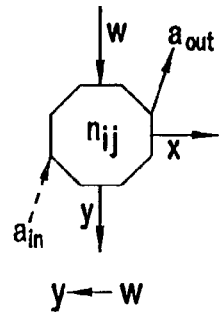
Figure 4C:
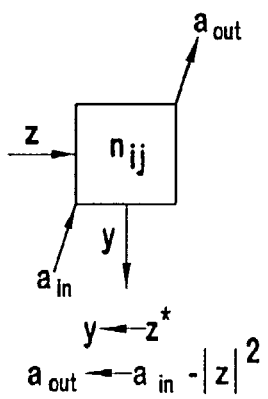

FIG. 4*d* is an octagon function performing Equations 24, 25 and 26.

$$y \leftarrow w \qquad \text{Equation 24}$$

$$x \leftarrow a_{in}/w \qquad \text{Equation 25}$$

$$a_{out} \leftarrow x \qquad \text{Equation 26}$$

Figure 4E:
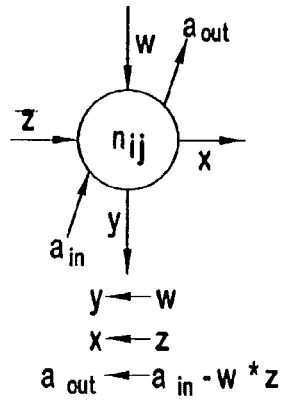

FIG. 4*e* is a circle function performing Equations 27, 28 and 29.

$$y \leftarrow w \qquad \text{Equation 27}$$

$$x \leftarrow z \qquad \text{Equation 28}$$

$$a_{out} \leftarrow a_{in} - w^*z \qquad \text{Equation 29}$$

Figure 5B:
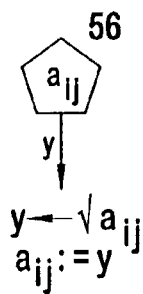
FIGS. 5a–5e are diagrams illustrating an example of mapping vector processors performing Cholesky decomposition onto scalar processors.
Figure 5D:
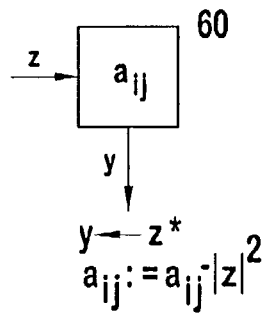
Figure 5C:
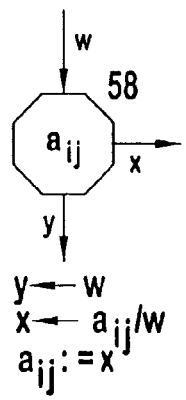
Figure 5E:
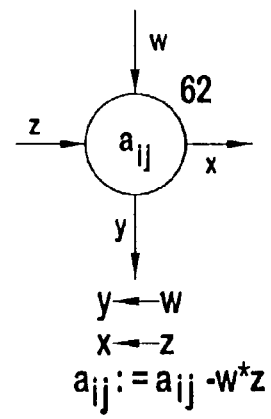
Figure 5A:
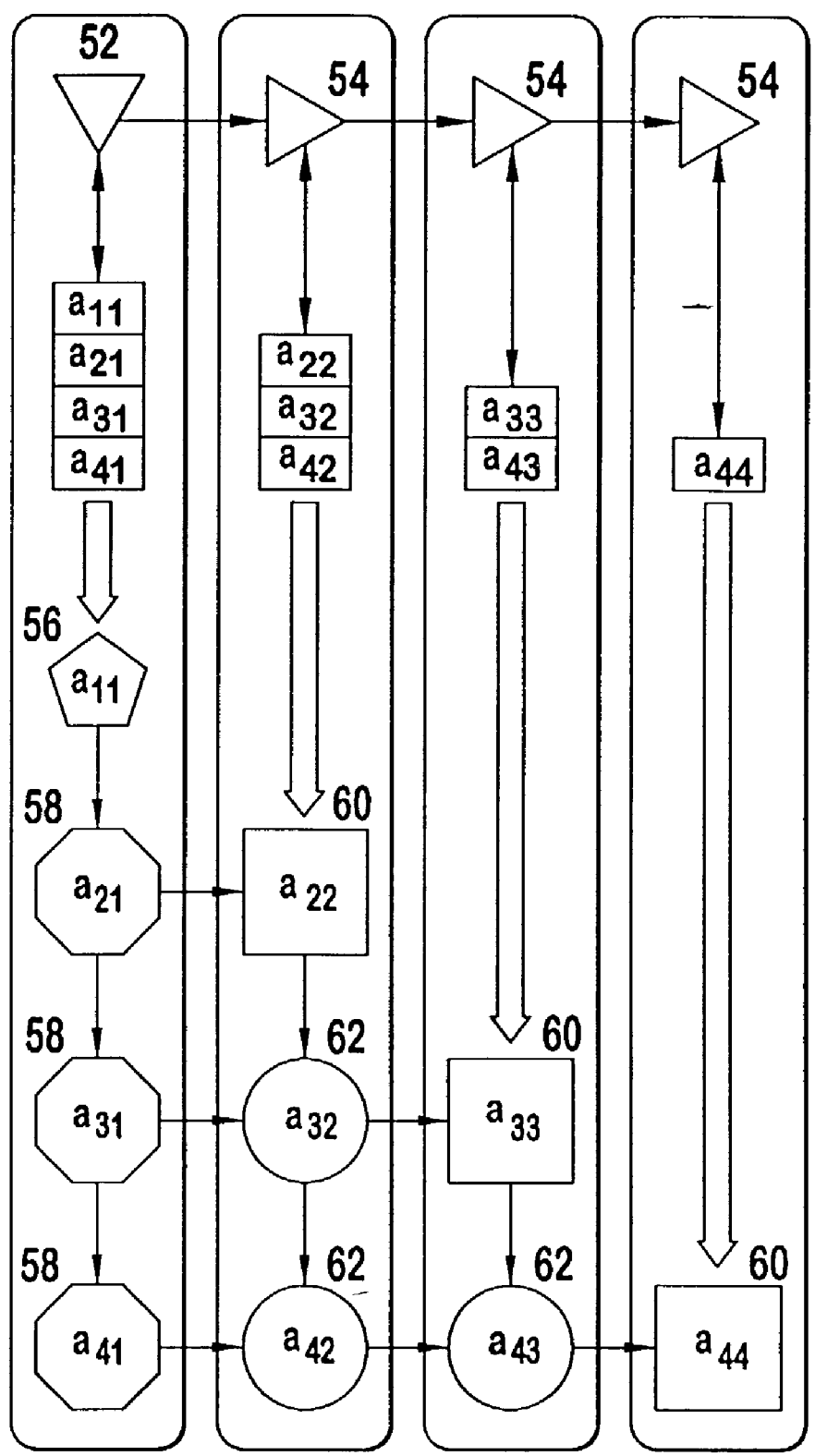

FIG. 5*a* is a diagram showing the mapping of the first stage of a vector based Cholesky decomposition for a 4×4 G matrix to the first stage of a two dimensional scalar based approach. Each vector processor 52, 54 is mapped onto at least one scalar processor 56, 58, 60, 62 as shown in FIG. 5*a*. Each scalar processor 56, 58, 60, 62 is associated with a memory cell, $a_{ij}$. The function to be performed by each processor 56, 58, 60, 62 is shown in FIGS. 5*b*–5*e*. FIG. 5*b* illustrates a pentagon function 56, which performs Equations 30 and 31.

$$y \leftarrow \sqrt{a_{ij}} \qquad \text{Equation 30}$$

$$a_{ij} := y \qquad \text{Equation 31}$$

:=indicates a sequential assignment. y indicates a value sent to a lower processor. FIG. 5*c* illustrates an octagonal function 58, which performs Equations 32, 33 and 34.

$$y \leftarrow w \qquad \text{Equation 32}$$

$$x \leftarrow a_{ij}/w \qquad \text{Equation 33}$$

$$a_{ij} := x \qquad \text{Equation 34}$$

w indicates a value sent from an upper processor. FIG. 5*d* illustrates a square function 60, which performs Equations 35 and 36.

$$y \leftarrow z^* \qquad \text{Equation 35}$$

$$a_{ij} := a_{ij} - |z|^2 \qquad \text{Equation 36}$$

x indicates a value sent to a right processor. FIG. 5*e* illustrates a circular function 62, which performs Equations 37, 38 and 39.

$$y \leftarrow w \qquad \text{Equation 37}$$

$$x \leftarrow z \qquad \text{Equation 38}$$

$$a_{ij} := a_{ij} - w^*z \qquad \text{Equation 39}$$

FIGS. 6*a*–6*d* illustrate the data flow through the scalar processors 56, 58, 60, 62 in four sequential stages (stages 1 to 4). As shown in FIGS. 6a–6d, a column of processors 56, 58 drops off after each stage. The process requires four processing cycles or N in general. One processing cycle for each stage. As shown in FIG. 5a, ten (10) scalar processors are required to determine a 4×4 G matrix. For an N×N matrix, the number of processors required is per Equation 40.

$$\text{No. Require Scalar Processors} = \sum_{i=1}^{N} i \qquad \text{Equation 40}$$

$$= \frac{N(N+1)}{2}$$

$$= \frac{N^2 + N}{2}$$

Figure 6A:
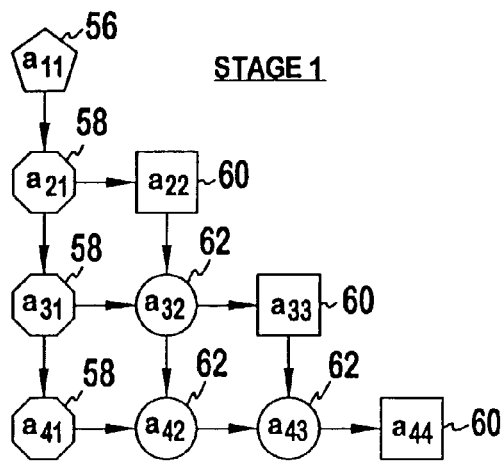
Figure 6B:
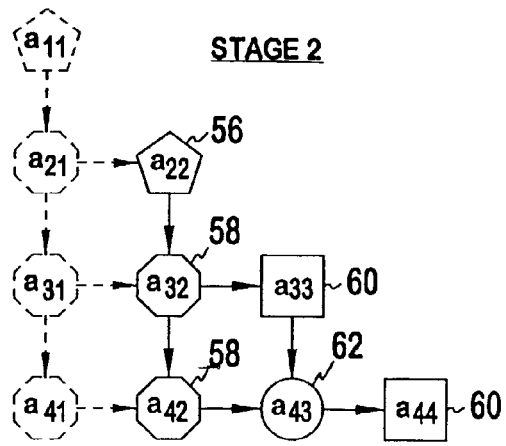
Figure 6C:
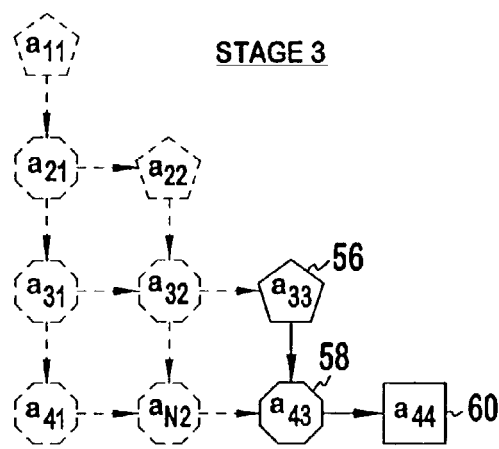
Figure 6D:
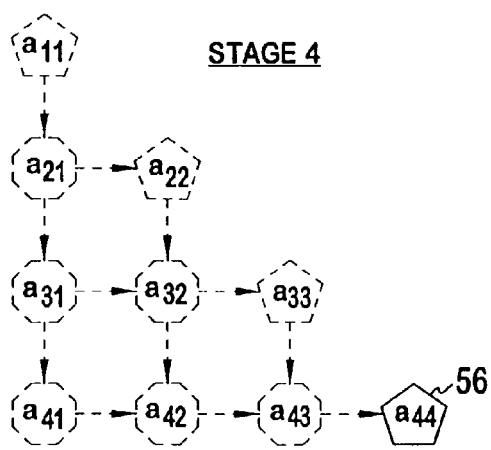
Figure 6E:
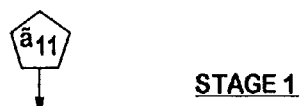
Figure 6F:
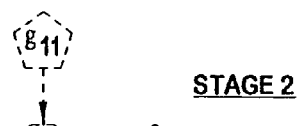

FIGS. 6e–6j illustrate the processing flow for a banded 5 by 5 matrix. Active processors are unhatched. The banded matrix has the lower left three entries ($a_{41}$, $a_{51}$, $a_{52}$, not shown in FIGS. 6e–6j) as zeros. As shown in FIG. 6e, in a first stage, the upper six processors are operating. As shown in FIG. 6f, the six active processors of stage 1 have determined $g_{11}$, $g_{21}$ and $g_{31}$ and three intermediate results, $\alpha_{22}$, $\alpha_{32}$ and $\alpha_{33}$ for use in stage 2.

Figure 6G:
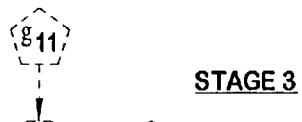
Figure 6H:
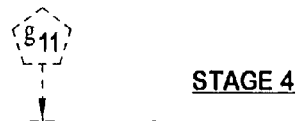
Figures 6I, 6J:
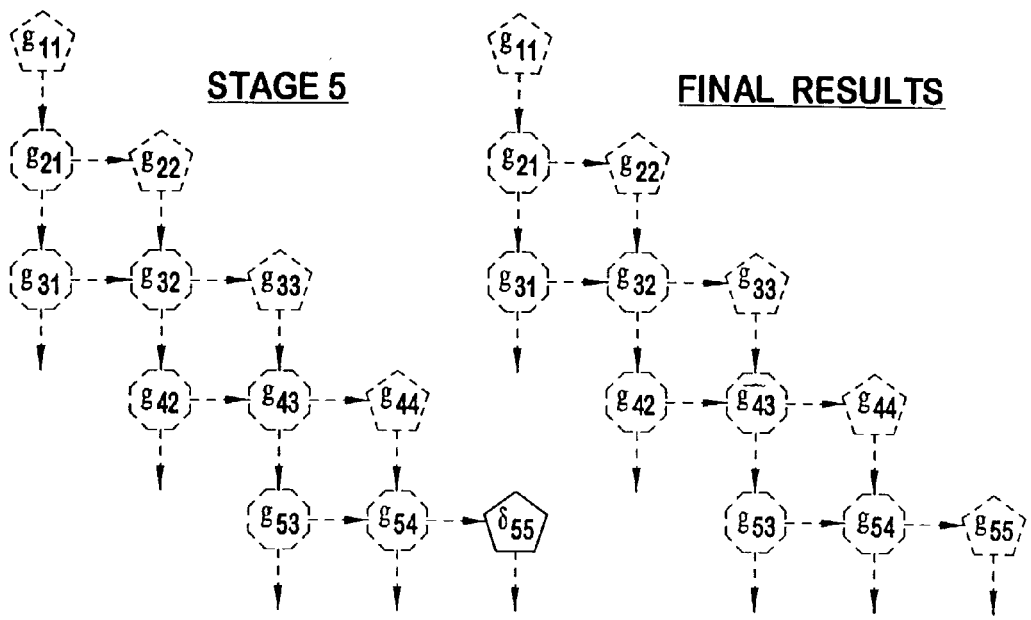

In stage 2, six processors ($\alpha_{22}$, $\alpha_{32}$, $\alpha_{33}$, $\tilde{a}_{42}$, $\tilde{a}_{43}$, $\tilde{a}_{44}$) are operating. As shown in FIG. 6g (stage 3), values for $g_{22}$, $g_{32}$ and $g_{42}$ and intermediate values for $\beta_{33}$, $\beta_{43}$, $\beta_{44}$ have determined in stage 2. In FIG. 6h (stage 4), values for $g_{33}$, $g_{43}$ and $g_{53}$ and intermediate values for $\gamma_{44}$, $\gamma_{54}$ and $\gamma_{55}$ have been determined. In FIG. 6 (stage 5), $g_{44}$ and $g_{54}$ and intermediate value $\delta_{55}$ have been determined. In FIG. 6j (final stage), the remaining value $g_{55}$ is available. As shown in the figures, due to the banded nature of the matrix, the lower left processors of an unloaded matrix are unnecessary and not shown.

The simplified illustrations of FIGS. 6a–6d are expandable to an N×N matrix as shown in FIG. 7. As shown in that figure, the top most processor 56 performs a pentagon function. Octagon function processors 58 extend down the first column and dual purpose square/pentagon processors 64 along the main diagonal, as shown by the two combined shapes. The rest of the processors 66 are dual purpose octagonal/circle processors 66, as shown by the two combined shapes. This configuration determines an N×N G matrix in N processing cycles using only scalar processors.

If the bandwidth of the matrix has a limited width, such as P, the number of processing elements can be reduced. To illustrate, if P equals N−1 the lower left processor for $a_{N1}$, drops off. If P equals N−2, two more processors ($a_{N-11}$ and $a_{N2}$) drop off.

Reducing the number of scalar processing elements further is explained in conjunction with FIGS. 8a–8e and 9a and 9b. FIGS. 8a–8e describe one dimensional execution planes of a four (4) scalar processor implementation of FIGS. 6a–6d. A delay element 68 of FIG. 8e is inserted between each concurrent connection as shown in FIG. 8a. The delay element 68 of FIG. 8e delays the input y to be a sequential output x, per Equation 41.

$$y := x \qquad \text{Equation 41}$$

For each processing cycle starting at $t_1$, the processors sequentially process as shown by the diagonal lines showing the planes of execution. To illustrate, at time $t_1$, only processor 56 of $a_{11}$ operates. At $t_2$, only processor 58 of $a_{21}$ operates and at $t_3$, processors 58, 60 of $a_{31}$ and $a_{22}$ operate and so until stage 4, $t_{16}$, where only processor 56 of $a_{44}$ operates. As a result, the overall processing requires $N^2$ clock cycles across N stages.

Multiple matrices can be pipelined through the two dimensional scalar processing array. As shown in FIGS. 8a–8d, at a particular plane of execution, $t_1$ to $t_{16}$, are active. For a given stage, up to a number of matrices equal to the number of planes of execution can be processed at the same time. To illustrate for stage 1, a first matrix is processed along diagonal $t_1$. For a next clock cycle, the first matrix passes to plane $t_2$ and plane $t_1$ is used for a second matrix. The pipelining can continue for any number of matrices. One drawback to pipelining is pipelining requires that the data for all the matrices be stored, unless the schedule of the availability of the matrix data is such that it does not stall.

After a group of matrices have been pipelined through stage 1, the group is pipelined through stage 2 and so forth until stage N. Using pipelining, the throughput of the array can be dramatically increased as well as processor utilization.

Since all the processors 56, 58, 60, 62 are not used during each clock cycle, when processing only 1 matrix, the number of processing elements 56, 58, 60, 62 can be reduced by sharing them across the planes of execution. FIGS. 9a and 9b illustrate two preferred implementations to reduce processing elements. As shown in FIG. 9a, a line perpendicular to the planes of execution (along the matrix diagonals) is shown for each processing element 56, 58 of the first column. Since all of the processors 56, 58, 60, 62 along each perpendicular operate in different processing cycles, their functions 56, 58, 60, 62 can be performed by a single processor 66, 64 as projected below. Processing functions 56 and 60 are performed by a new combined function 64. Processing functions 58 and 62 are performed by a new combined function 66. The delay elements 68 and connections between the processors are also projected. Although the left most processing element is shown as using a dual function element 66, that element can be simplified to only perform the octagonal function 58, if convenient for a non-banded matrix.

FIG. 10a is an expansion of FIG. 9a to accommodate an N×N G matrix. As shown in FIG. 10a, N processors 66, 64 are used to process the N×N G matrix. As shown in FIG. 3a, the processing functions of FIG. 10a can be performed by N scalar processors 54. The same number of scalar processors as the bandwidth, P, can be used to process the G matrix in the banded case.

In the implementation of FIG. 3a, each processor is used in every other clock cycle. The even processors operate in one cycle and the odd in the next. To illustrate, processor 2 (second from the right) of FIG. 9a processes at times $t_2$, $t_4$ and $t_6$ and processor 3 at $t_3$ and $t_5$. As a result, two G matrices can be determined by the processing array at the same time by interlacing them as inputs to the array. This approach greatly increases the processor utilization over the implementation of FIG. 7.

To reduce the processing time of a single array, the implementation of FIG. 9b is used. The delay elements between every other processor connection is removed, as shown in FIG. 9b. At time $t_1$, only processor 56 of $a_{11}$ operates. However, at $t_2$, processors 58, 60 at $a_{21}$, $a_{22}$ and $a_{31}$ are all operating. Projecting this array along the perpendicular (along the diagonals of the original matrix) is also shown in FIG. 9b. As shown, the number of delay elements 68 is cut in half. Using this array, the processing time for an N×N G matrix is cell (NP−($P^2$−P)/2). Accordingly, the processing time for a single G matrix is greatly reduced.

Another advantage to the implementations of FIGS. 7, 3a and 3b is that each processing array is scalable to the matrix bandwidth. For matrices having lower bandwidths (lower diagonal elements being zero), those elements' processors 58, 66 in FIG. 7 drop out. With respect to FIGS. 3a and 3b, since the lower diagonal elements correspond to the left most perpendicular lines of FIGS. 9a and 9b, the processors projected by those perpendicular lines drop out. To illustrate using FIG. 9a, the bandwidth of the matrix has the processing elements 58, 62 of $a_{41}$, $a_{31}$ and $a_{42}$ as zeros. As a result, the projection to processors 66 (left most two) are unnecessary for the processing. As a result, these implementations are scalable to the matrix bandwidth.

FIGS. 9c–9n illustrate the timing diagrams for each processing cycle of a banded 5 by 5 matrix having a bandwidth of 3 with delays between every other connection. At each time period, the value associated with each processor is shown. Active processors are unhatched. As shown in the figures, the processing propagates through the array from the upper left processor in FIG. 9c, stage 1, time 0 ($ã_{11}$) to the lower right processor in FIG. 9n, stage 5 ($δ_{55}$). As shown in the figures, due to the banded nature of the matrix, the lower left processors of an unbanded matrix processing are unnecessary and not shown.

FIGS. 9o–9z illustrate the timing diagrams and memory access for each processing cycle of a linear array, such as per FIG. 9b, processing a banded 5 by 5 matrix. As shown, due to the 5 by 5 matrix having a bandwidth of 3, only three processors are needed. The figures illustrate that only three processors are required to process the banded matrix. As also shown, each stage has a relatively high processor utilization efficiency, which increases as N/p increases.

To reduce the complexity of the processing elements, the divide and square root function are not performed by those elements (pulled out). Divides and square roots are more complex to implement on an ASIC than adders, subtractors and multipliers.

The only two functions which perform a divide or a square root is the pentagon and octagon functions 56, 58. For a given stage, as shown in FIGS. 6a–6d, the pentagon and octagon functions 56, 58 are all performed on a single column during a stage. In particular, each of these columns has a pentagon 58 on top and octagons 58 underneath. Since each octagon 58 concurrently assigns its w input to its y output, the output of the pentagon 56 flows down the entire column, without the value for w being directly stored for any $a_{ij}$. The octagon 58 also uses the w input to produce the x output, which is also fed back to $a_{ij}$. The x output is used by the square and circle functions 60, 62 in their $a_{ij}$ calculations. As a result, only the value for each octagon's x output needs to be determined. The x output of the octagon is the $a_{ij}$, for that octagon 58 divided by the value of the w input, which is the same for each octagon 58 and is the y output of the pentagon 56. Accordingly, the only division/square root function that is required to be performed is calculating x for the octagon 58.

Using Equations 34 and 30, each octagon's x output is that octagon's $a_{ij}$ divided by the square root of the pentagon's $a_{ij}$. Using a multiplier instead of a divider within each octagon processor, for a given stage, only the reciprocal of the square root of the pentagon's $a_{ij}$ needs to be determined instead of the square root, isolating the divide function to just the pentagon processor and simplifying the overall complexity of the array. The reciprocal of the square root would then be stored as the $a_{ij}$ of the matrix element associated with the pentagon instead of the reciprocal. This will also be convenient later during forward and backward substitution because the divide functions in those algorithms become multiples by this reciprocal value, further eliminating the need for dividers in other processing elements, i.e. the x outputs of FIGS. 12d and 15d. Since the pentagon function 56 as shown in FIGS. 9a and 9b is performed by the same processor 64, the processors 66, 64 can be implemented using a single reciprocal/square root circuit 70 having an input from the pentagon/square processor 64 and an output to that processors 64, as shown in FIGS. 10a and 10b. The result of the reciprocal of the square root is passed through the processors 66. FIGS. 11a and 11b correspond to FIGS. 10a and 10b. Separating the reciprocal/square root function 70 simplifies the complexity of the other processor 66, 64. Although the divide/square root circuit 70 can be implemented by using a reciprocal and a square root circuit, it is preferably implemented using a look up table, especially for a field programmable gate array (FPGA) implementation, where memory is cost efficient.

After the Cholesky factor, G, is determined, $\underline{y}$ is determined using forward substitution as shown in FIGS. 12a and 12b. The algorithm for forward substitution is as follows.

for j=1:N $$y_j = \frac{1}{g_{jj}}\left(r_j - \sum_{i=1}^{j-1} g_{ji} y_i\right)$$

end

For a banded matrix, the algorithm is as follows.

```
for j = 1:N
    for i = j + 1:min(j + p, N)
        r_I = r_I - G_{IJ}r_J;
    end for;
end for;
y = r_J;
```

$g_{LK}$ is the corresponding element at row L, column K from the Cholesky matrix, G.

FIGS. 12a and 12b are two implementations of forward substitution for a 4×4 G matrix using scalar processors. Two functions are performed by the processors 72, 74, the star function 72 of FIG. 12c and the diamond function 74 of FIG. 12d. The star 72 performs Equations 42 and 43.

$y \leftarrow w$      Equation 42

$x \leftarrow z - w * g_{ij}$      Equation 43

The diamond function 74 performs Equations 44 and 45.

$x \leftarrow z/g_{ij}$      Equation 44

$y \leftarrow x$      Equation 45

Inserting delay elements between the concurrent connections of the processing elements as in FIG. 12a and projecting the array perpendicular to its planes of execution ($t_1$ to $t_7$) allows the array to be projected onto a linear array. The received vector values from $\tilde{r}$, $r_1$–$r_4$, are loaded into the array and $y_1$–$y_4$ output from the array. Since the diamond function 74 is only along the main diagonal, the four (4) processing element array can be expanded to process an N×N matrix using the N processing elements per FIG. 13a. The processing time for this array is 2 N cycles.

Since each processing element is used in only every other processing cycle, half of the delay elements can be removed as shown in FIG. 12b. This projected linear array can be expanded to any N×N matrix as shown in FIG. 13b. The processing time for this array is N cycles.

The operation per cycle of the processing elements of the projected array of FIG. 13b is illustrated in FIGS. 14a–14d. In the first cycle, $t_1$, of FIG. 13a, $r_1$ is loaded into the left processor 1 (74) and $y_1$ is determined using $r_1$ and $g_{11}$. In the second cycle, $t_2$, of FIG. 14b, $r_2$ and $r_3$ are loaded, $g_3$, $g_{21}$ and $g_{22}$ are processed and $y_2$ is determined. In the third cycle, $t_3$, of FIG. 14c, $r_4$ is loaded, $g_{41}$, $g_{42}$, $g_{32}$, $g_{33}$ are loaded, and $y_3$ is determined. In the fourth cycle, $t_4$, of FIG. 14d, $g_{43}$ and $g_{44}$ are processed and $y_4$ is determined.

FIGS. 12e–12j illustrate the timing diagrams for each processing cycle of a banded 5 by 5 matrix. FIG. 12e shows the banded nature of the matrix having three zero entries in the lower left corner (a bandwidth of 3).

To show that the same processing elements can be utilized for forward as well as Cholesky decomposition, FIG. 12f begins in stage 6. Stage 6 is the stage after the last stage of FIGS. 9c–9n.

Figures 12N, 12O, 12P:
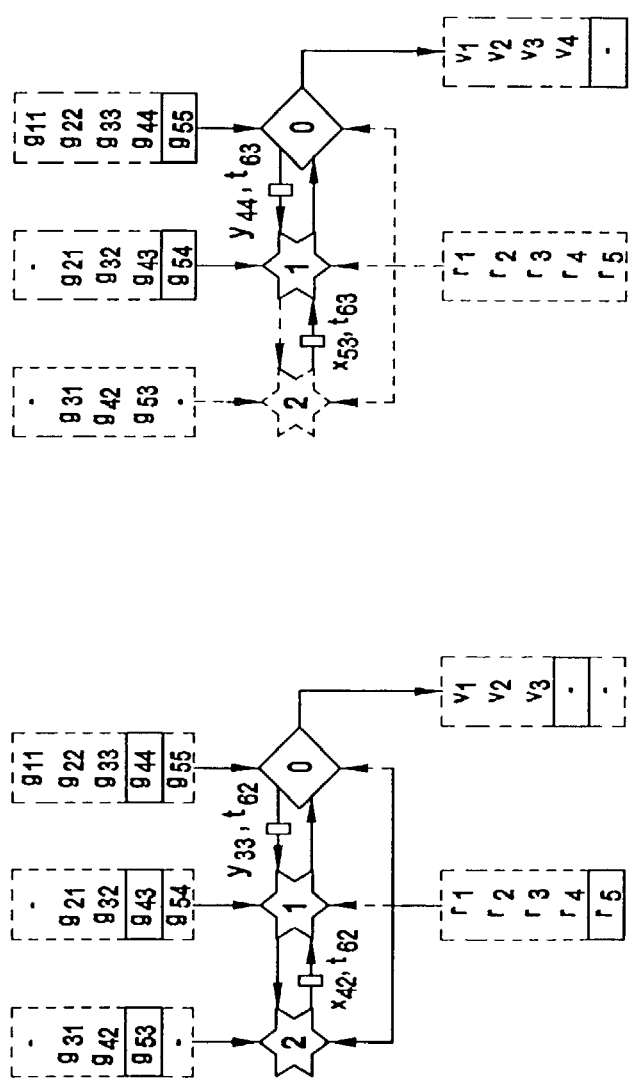
Figure 14D:
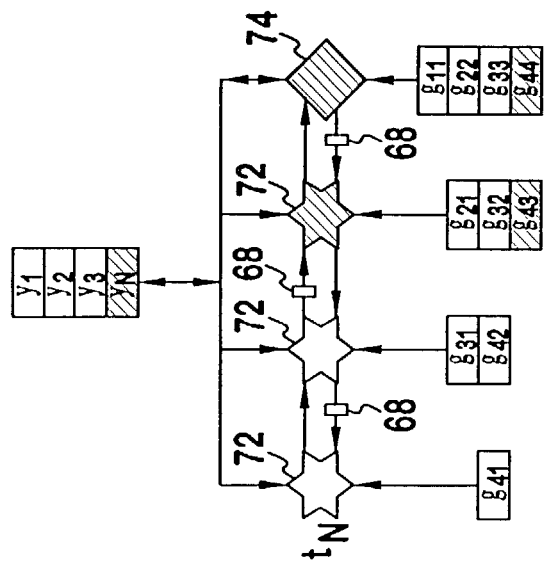
Figure 14C:
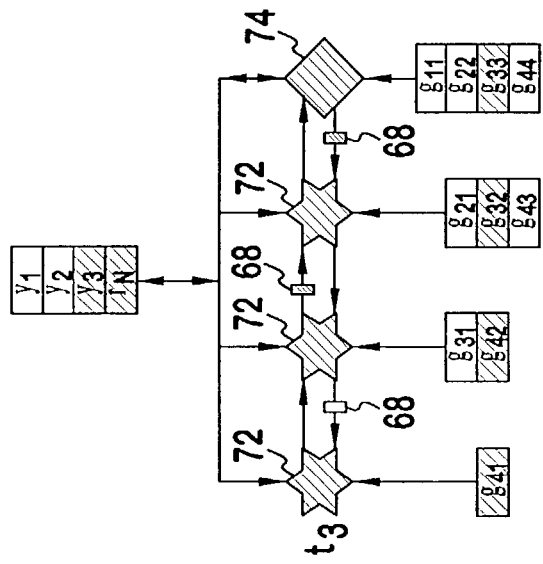
Figure 14B:
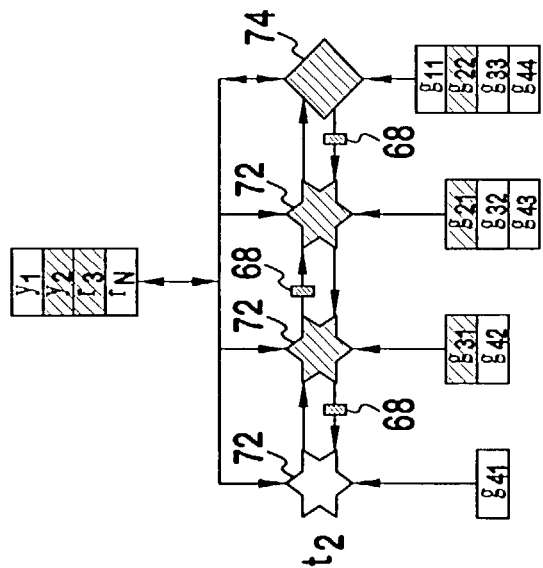

Similarly, FIGS. 12k–12p illustrate the extension of the processors of FIGS. 9o–9z to also performing forward substitution. These figures begin in stage 6, after the 5 stages of Cholesky decomposition. The processing is performed for each processing cycle from stage 6, time 0 (FIG. 12k) to the final results (FIG. 12p), after stage 6, time 4 (FIG. 12o).

After the y variable is determined by forward substitution, the data vector can be determined by backward substitution. Backward substitution is performed by the following subroutine.

for j=N:1

$$d_j = \frac{1}{g_{jj}}\left(y_j - \sum_{i=j+1}^{N} g^*_{ji} d_i \right)$$

end

For a banded matrix, the following subroutine is used.

```
for j = N : 1
  y_J = y_J /G_JJ^H j ;
  for i = min(1, j - P): j - 1
    y_I = y_I - G_IJ^H y_J
  end for;
end for;
d = y;
```

$(\cdot)^*$ indicates a complex conjugate function. $g^*_{LK}$ is the complex conjugate of the corresponding element determined for the Cholesky factor G. $Y_L$ is the corresponding element of y.

Backward substitution is also implemented using scalar processors using the star and diamond functions 76, 78 as shown in FIGS. 15a and 15b for a 4×4 processing array. However, these functions, as shown in FIGS. 15c and 15d, are performed using the complex conjugate of the G matrix values. Accordingly, Equations 42–45 become 46–49, respectively.

| | |
|---|---|
| $y \leftarrow w$ | Equation 46 |
| $x \leftarrow z - w^* g^*_{ij}$ | Equation 47 |
| $x \leftarrow z/g^*_{jj}$ | Equation 48 |
| $y \leftarrow x$ | Equation 49 |

The delays 68 at the concurrent assignments between processors 76, 78, the array of FIG. 15a is projected across the planes of execution to a linear array. This array is expandable to process an N×N matrix, as shown in FIG. 16a. The y vector values are loaded into the array of FIG. 16a and the data vector, d, is output. This array takes 2N clock cycles to determine d. Since every other processor operates in every other clock cycle, two ds can be determined at the same time.

Since each processor 76, 78 in 16a operates in every other clock cycle, every other delay can be removed as shown in FIG. 15b. The projected array of FIG. 15b is expandable to process an N×N matrix as shown in FIG. 16b. This array takes N clock cycles to determine d.

The operations per cycle of the processing elements 76, 78 of the projected array of FIG. 16b is illustrated in FIGS. 17a–17d. In the first cycle, $t_1$, of FIG. 17a, $y_4$ is loaded, $g^*_{44}$ is processed and $d_4$ is determined. In the second cycle, $t_2$, of FIG. 17b, $y_2$ and $y_3$ are loaded, $g^*_{43}$ and $g^*33$ are processed and $d_3$ is determined. In the third cycle, $t_3$, of FIG. 17c, $y_1$ is loaded, $g^*_{41}$, $g^*_{42}$, $g^*_{32}$ and $g^*_{22}$ are processed and $d_2$ is determined. In the fourth cycle, $t_4$, of FIG. 17d, $g^*_{43}$ and $g^*_{44}$ are processed and $d_4$ is determined.

FIGS. 15e–15j illustrates the extension of the processors of FIGS. 12e–12j to performing backward substitution on a banded matrix. FIG. 15e shows the banded nature of the matrix having three zero entries in the lower left corner.

The timing diagrams begin in stage 7, which is after stage 6 of forward substitution. The processing begins in stage 7, time 0 (FIG. 15f) and is completed at stage 7, time 4 (FIG. 15j). After stage 7, time 4 (FIG. 15j), all of the data, $d_1$ to $d_5$, is determined.

Similarly, FIGS. 15k–15p illustrate the extension of the processors of FIGS. 12k–12p to also performing backward substitution. These figures begin in stage 7, after stage 6 of forward substitution. The processing is performed for each processing cycle from stage 7, time 0 (FIG. 15k) to the final results (FIG. 15p). As shown in FIGS. 9c–9n, 12e–12j and 15e–15j, the number of processors in a two dimensional array can be reduced for performing Cholesky decomposition, forward and backward substitution for banded matrices. As shown by FIGS. 9o–9z, 12k–12p, the number of processors in a linear array is reduced from the dimension of matrix to the bandwidth of banded matrices.

To simplify the complexity of the individual processing elements 72, 74, 76, 78 for both forward and backward substitution, the divide function 80 can be separated from the elements 72, 74, 76, 78, as shown in FIGS. 18a and 18b. FIGS. 18a and 18b correspond to FIGS. 16a and 16b, respectively. Although the data associated with the processing elements 72, 74, 76, 78 for forward and backward substitution differ, the function performed by the elements 72, 74, 76, 78 is the same. The divider 80 is used by the right most processor 74, 78 to perform the division function. The divider 80 can be implemented as a look up table to determine a reciprocal value, which is used by the right most processor 74, 78 in a multiplication. Since during forward and backward substitution the reciprocal from Cholesky execution already exists in memory, the multiplication of the reciprocal for forward and backward substitution can utilize the reciprocal already stored in memory.

Since the computational data flow for all three processes (determining G, forward and backward substitution) is the same, N or the bandwidth P, all three functions can be performed on the same reconfigurable array. Each processing element 84, 82 of the reconfigurable array is capable of operating the functions to determine G and perform forward and backward substitution, as shown in FIGS. 19a and 19b. The right most processor 82 is capable of performing a pentagon/square and diamond function, 64, 74, 78. The other processors 84 are capable of performing a circle/octagon and star function 66, 72, 76. When performing Cholesky decomposition, the right most processor 82 operates using the pentagon/square function 64 and the other processors 84 operate using the circle/octagon function 66. When performing forward and backward substitution, the right most processor 82 operates using the diamond function 74, 78 and the other processors 84 operate using the star function 72, 76. The processors 82, 84 are, preferably, configurable to perform the requisite functions. Using the reconfigurable array, each processing element 82, 84 performs the two arithmetic functions of forward and backward substitution and the four functions for Cholesky decomposition, totaling six arithmetic functions per processing element 82, 84. These functions may be performed by an arithmetic logic unit (ALU) and proper control logic or other means.

To simplify the complexity of the individual processing elements 82, 84 in the reconfigurable array, the divide and square root functionality 86 are preferably broken out from the array by a reciprocal and square root device 86. The reciprocal and square root device 86, preferably, determines the reciprocal to be in a multiplication, as shown in FIGS. 20a and 20b by the right most processor 82 in forward and backward substitution and the reciprocal of the square root to be used in a multiplication using the right most processor data and passed through the processors 84. The determination of the reciprocal and reciprocal/square root is, preferably, performed using a look up table. Alternately, the divide and square root function block 86 may be a division circuit and a square root circuit.

To reduce the number of processors 82, 84 further, folding is used. FIGS. 21a and 21b illustrate folding. In folding, instead of using P processing elements 82, 84 for a linear system solution, a smaller number of processing elements, F, are used for Q folds. To illustrate, if P is nine (9) processors 82, 84, three (3) processors 82, 84 perform the function of the nine (9) processors over three (3) folds. One drawback with folding is that the processing time of the reduced array is increased by a multiple Q. One advantage is that the efficiency of the processor utilization is typically increased. For three folds, the processing time is tripled. Accordingly, the selection of the number of folds is based on a trade off between minimizing the number of processors and the maximum processing time permitted to process the data.

FIG. 21a illustrates bi-directional folding for four processing elements $76_1$, $76_2$, $76_3$, $76_4/78$ performing the function of twelve elements over three folds of the array of 11b. Instead of delay elements being between the processing elements $76_1$, $76_2$, $76_3$, $76_4/78$, dual port memories $86_1$, $86_2$, $86_3$, $86_4$ (86) are used to store the data of each fold. Although delay elements (dual port memories 86) may be present for each processing element connection, such as for the implementation of FIG. 12a, it is illustrated for every other connection, such as for the implementation of FIG. 12b. Instead of dual port memories, two sets of single port memories may be used.

During the first fold, each processors' data is stored in its associated dual port memory 86 in an address for fold 1. Data from the matrix is also input to the processors $76_1$–$76_3$, $76_4/78$ from memory cells $88_1$–$88_4$ (88). Since there is no wrap-around of data between fold 1 processor $76_4/78$ and fold 3 processor $76_1$, a dual port memory 86 is not used between these processors. However, since a single address is required between the fold 1 and fold 2 processor 76, and between fold 2 and fold 3 processor $76_4/78$, a dual port memory 86 is shown as a dashed line. During the second fold, each processor's data is stored in a memory address for fold 2. Data from the matrix is also input to the processors $76_1$–$76_3$, $76_4/78$ for fold 2. Data for fold 2 processor 76, comes from fold 1 processor $76_1$, which is the same physical processor $76_1$ so (although shown) this connection is not necessary. During the third fold, each processor's data is stored in its fold 3 memory address. Data from the matrix is also input to the processors $76_1$–$76_3$, $76_4/78$ for fold 3. Data for fold 3 processor $76_4/78$ comes from fold 2 processor $76_4/78$ so this connection is not necessary. For the next processing stage, the procedure is repeated for fold 1.

FIG. 22a is an implementation of bidirectional folding of FIG. 21a extended to N processors $76_1$–$76_{N-1}$, $76_N/78$. The processors $76_1$–$76_{N-1}$, $76_N/78$ are functionally a array, accessing the dual port memory 86 or two sets of single port memories.

FIG. 21b illustrates a one directional folding version of the array of 11b. During the first fold, each processor's data is stored in its associated dual port memory address for fold 1. Although fold 1 processor $76_4/78$ and fold 3 processor $76_1$ are physically connected, in operation no data is transferred directly between these processors. Accordingly, the memory port $86_4$ between them has storage for one less address. Fold 2 processor $76_4/78$ is effectively coupled to fold 1 processor $76_1$ by the ring-like connection between the processors. Similarly, fold 3 processor $76_4/78$ is effectively coupled to fold 2 processor $76_1$.

FIG. 22b is an implementation of one directional folding of FIG. 20b extended to N processors. The processors $76_1$–$76_{N-1}$, $76_N/78$ are functionally arranged in a ring around the dual memory.

To implement Cholesky decomposition, forward and backward substitution onto folded processors, the processor, such as the $76_4/78$ processor, in the array must be capable of performing the functions for the processors for Cholesky decomposition, forward and backward substitution, but also for each fold. As shown in FIGS. 20a and 20b for processor $76_4/78$. Depending on the implementation, the added processor's required capabilities may increase the complexity of that implementation. To implement folding using ALUs, one processor (such as $76_4/78$ processor) performs twelve arithmetic functions (four for forward and backward substitution and eight for Cholesky) and the other processors only perform six functions.

FIG. 23 illustrates a slice of a preferred simple reconfigurable PE that can be used to perform all six of the functions defined in Cholesky decomposition, forward substitution, and backward substitution. This PE is for use after the divides are isolated to one of the PEs (referred to as follows as PE1). Two slices are preferably used, one to generate the real x and y components, the other to generated their imaginary components. The subscripts i and r are used to indicate real and imaginary components, respectively.

The signals w, x, y, and z are the same as those previously defined in the PE function definitions. The signals $a^q$ and $a^d$ represent the current state and next state, respectively, of a PE's memory location being read and/or written in a particular cycle of the processing. The names in parentheses indicate the signals to be used for the second slice.

This preferred processing element can be used for any of the PEs, though it is desirable to optimize PE1, which performs the divide function, independently from the other PEs. Each input to the multiplexers $94_1$ to $94_8$ is labeled with a '−' to indicate that it is used for PE1 only, a '+' to indicate that it is used for every PE except PE1, or a '+' to indicate that it is used for all of the PEs. The isqr input is connected to zero except for the real slice of PE1, where it is connected to the output of a function that generates the reciprocal of the square root of the $a^q_r$ input. Such a function could be implemented as a LUT with a ROM for a reasonable fixed-point word size.

As shown in FIG. 23, the output of multiplexers $94_1$ and $94_2$ are multiplied by multiplier $96_1$. The output of multiplexers $94_3$ and $94_4$ are multiplied by a multiplier $96_2$. The outputs of multipliers $96_1$ and $96_2$ is combined by an add/subtract circuit 98. The output of the add/subtract circuit 98 is combined with the output of multiplexer $94_5$ by a subtractor 99. The output of subtractor 99 is an input to multiplexer $94_8$.

What is claimed is:

1. A user equipment for recovering data from a plurality of data signals received as a received vector, the user equipment configured to determine data of the received vector by determining a Cholesky factor of an N by N matrix and to use the determined Cholesky factor in forward and backward substitution to determine the data of the received data signals, the user equipment comprising an array of at most N scalar processing elements, the array having an input configured to receive elements from the N by N matrix and the received vector, each scalar processing element used in determining the Cholesky factor and performing forward and backward substitution, the array configured to output data of the received vector wherein the N×N matrix has a bandwidth P and a number of the at most N scalar processing elements is P and P is less than N.

2. The user equipment of claim 1 wherein each scalar processing element is configured to process a diagonal of a matrix being processed by the array in determining the Cholesky factor and to perform forward and backward substitution.

3. The user equipment of claim 2 wherein each processing element is configured to perform processing for a plurality of diagonals of the N by N matrix.

4. The user equipment of claim 2 wherein a delay element is operatively coupled between each scalar processing element and the array is capable of processing two N by N matrices concurrently.

5. The user equipment of claim 2 wherein all the scalar processing elements have a common reconfigurable implementation.

6. A user equipment for recovering data from a plurality of data signals received as a received vector, the user equipment configured to determine data of the received vector by determining a Cholesky factor of an N by N matrix and to use the determined Cholesky factor in forward and backward substitution to determine the data of the received data signals, the user equipment comprising:

an array of at most N scalar processing elements, the array having an input configured to receive elements from the N by N matrix and the received vector, each scalar processing element used in determining the Cholesky factor and performing forward and backward substitution, the array configured to output data of the received vector; and a square root and reciprocal device wherein the square root and reciprocal device is coupled only to a single scalar processing element of the array and no scalar processing elements of the array can perform a square root and reciprocal function.

7. The user equipment of claim 6 wherein the square root and reciprocal device is configured to use a look up table.

8. A user equipment for recovering data from a plurality of data signals received as a received vector, the user equipment configured to determine data of the received vector by determining a Cholesky factor of an N by N matrix and to use the determined Cholesky factor in forward and backward substitution to determine the data of the received data signals, the user equipment comprising an array of at most N scalar processing elements, the array having an input configured to receive elements from the N by N matrix and the received vector, each scalar processing element used in determining the Cholesky factor and performing forward and backward substitution, the array configured to output data of the received vector wherein each scalar processing element is configured to process a diagonal of a matrix being processed by the array in determining the Cholesky factor and to perform forward and backward substitution and for each of a plurality of folds, a scalar processing element is configured to process elements from a single diagonal of the N by N matrix.

9. The user equipment of claim 8 wherein a number of folds minimizes a number of the scalar processing elements and allows a processing time for the N by N matrix to be less than a maximum permitted.

10. The user equipment of claim 8 wherein the scalar processing elements are functionally arranged linearly with data flowing two directions through the array.

11. A base station for recovering data from a plurality of data signals received as a received vector, the base station configured to determine data of the received vector by determining a Cholesky factor of an N by N matrix and using the determined Cholesky factor in forward and backward substitution to determine the data of the received data signals, the base station comprising an array of at most N scalar processing elements, the array having an input configured to receive elements from the N by N matrix and the received vector, each scalar processing element used in determining the Cholesky factor and performing forward and backward substitution, the array configured to output data of the received vector wherein the N×N matrix has a bandwidth P and a number of the at most N scalar processing elements is P and P is less than N.

12. The base station of claim 11 wherein each scalar processing element is configured to process a diagonal of a matrix being processed by the array in determining the Cholesky factor and to perform forward and backward substitution.

13. A base station for recovering data from a plurality of data signals received as a received vector, the base station configured to determine data of the received vector by determining a Cholesky factor of an N by N matrix and using the determined Cholesky factor in forward and backward substitution to determine the data of the received data signals, the base station comprising:

an array of at most N scalar processing elements, the array having an input configured to receive elements from the N by N matrix and the received vector, each scalar processing element used in determining the Cholesky factor and performing forward and backward substitution, the array configured to output data of the received vector; and a square root and reciprocal device wherein the square root and reciprocal device is coupled only to a single scalar processing element of the array and no scalar processing elements of the array can perform a square root and reciprocal function.

14. The base station of claim 13 wherein the square root and reciprocal device is configured to use a look up table.

15. A base station for recovering data from a plurality of data signals received as a received vector, the base station configured to determine data of the received vector by determining a Cholesky factor of an N by N matrix and using the determined Cholesky factor in forward and backward substitution to determine the data of the received data signals, the base station comprising an array of at most N scalar processing elements, the array having an input configured to receive elements from the N by N matrix and the received vector, each scalar processing element used in determining the Cholesky factor and performing forward and backward substitution, the array configured to output data of the received vector wherein each processing element performs processing for a plurality of diagonals of the N by N matrix.

16. The base station of claim 15 wherein for each of a plurality of folds, each scalar processing element processes elements from a single diagonal of the N by N matrix.

17. The base station of claim 16 wherein a number of folds minimizes a number of the scalar processing elements and allows a processing time for the N by N matrix to be less than a maximum permitted.

18. The base station of claim 17 wherein the scalar processing elements are functionally arranged linearly with data flowing two directions through the array.

19. The base station of claim 18 wherein a delay element is operatively coupled between each scalar processing element and the array is capable of processing two N by N matrices concurrently.

20. The base station of claim 19 wherein all the scalar processing elements have a common reconfigurable implementation.

* * * * *

UNITED STATES PATENT AND TRADEMARK OFFICE
CERTIFICATE OF CORRECTION

PATENT NO. : 7,218,624 B2
APPLICATION NO. : 10/172113
DATED : May 15, 2007
INVENTOR(S) : Becker et al.

It is certified that error appears in the above-identified patent and that said Letters Patent is hereby corrected as shown below:

ON THE TITLE PAGE

Item (75), Inventors, page 1, left column, line 2, delete "Shane S. Supplee" and insert therefor --Stephen S. Supplee--.

At column 1, line 24, after the words "where all", delete "users" and insert therefor --user--.

At column 1, delete Equation 1, and insert therefor --$A\underline{d} + \underline{n} = \underline{r}$--.

At column 2, line 6, after the word "transpose", delete "(hermetian)" and insert therefor --(Hermitian)--.

At column 2, delete line 55, and insert therefor --$a_{i:\lambda,i} = a_{i:\lambda,i} - a^*_{i,j} \cdot a_{i:\lambda,j}$ ;--.

At column 2, delete line 58, and insert therefor --$a_{i:\lambda,i} = a_{i:\lambda,i} / a_{ii}$;--.

At column 2, line 64, after the word "transpose", delete "(hermetian)" and insert therefor --(Hermitian)--.

At column 3, delete lines 6 - 16, and insert therefor
--j = 1
  while j < μ
   recv($g_{j:N}$,left)
   if μ < N
    send($g_{j:N}$,right)
   end
   $a_{\mu:N,\mu} = a_{\mu:N,\mu} - g^*_\mu g_{\mu:N}$
   j = j + 1
  end
  $a_{\mu:N,\mu} = a_{\mu:N,\mu} / \sqrt{a_{\mu\mu}}$ if μ < N
  send ($a_{\mu:N,\mu}$,right)
end--.

At column 3, delete Equation 16, and insert therefor --$v \leftarrow a_{\mu:N,\mu} / \sqrt{a_{\mu\mu}}$ --.

At column 3, delete Equation 19, and insert therefor --$a_{\mu:N,\mu} = a_{\mu:N,\mu} - v_\mu v_{\mu:N}$--.

UNITED STATES PATENT AND TRADEMARK OFFICE
CERTIFICATE OF CORRECTION

PATENT NO. : 7,218,624 B2
APPLICATION NO. : 10/172113
DATED : May 15, 2007
INVENTOR(S) : Becker et al.

It is certified that error appears in the above-identified patent and that said Letters Patent is hereby corrected as shown below:

At column 4, line 34, before the words "for a", delete "6a-6j" and insert therefor --6a-6d--.

At column 4, line 45, after the words "onto a", delete "ID" and insert therefor --1D--.

At column 7, line 56, before the words "of a", delete "planes" and insert therefor --plane--.

At column 10, line 8, after the words "pentagon/square", insert --root--.

At column 10, delete lines 35-40, and insert therefor
--for j = 1:N
  for i = j + 1:min(j+p,N)
    $r_i = r_i - G_{ij}r_j$;
  end for;
 end for;
$y = r_j$;--.

At column 11, line 11, after the word "loaded", delete "$g_3, g_{21}$", and insert therefor --$g_{31}, g_{32}$--.

At column 11, delete lines 50-55, and insert therefor
--for j = N:1
  $y_j = y_j / G^H_{JJ} j$;
  for i = min(1,j–P):j–1
    $y_j = y_j - G^H ij\, y_j$
  end for;
 end for;
d = y;--.

At column 12, line 29, before the words "are processed", delete "g*33" and insert therefor --$g^*_{33}$--.

At column 12, line 34, before the words "the extension", delete "illustrates" and insert therefor --illustrate--.

At column 13, line 17, before the word "function", insert --root--.

UNITED STATES PATENT AND TRADEMARK OFFICE
CERTIFICATE OF CORRECTION

PATENT NO. : 7,218,624 B2
APPLICATION NO. : 10/172113
DATED : May 15, 2007
INVENTOR(S) : Becker et al.

It is certified that error appears in the above-identified patent and that said Letters Patent is hereby corrected as shown below:

At column 14, line 11, after the word "processor", delete "76," and insert therefor --76$_1$--.

At column 14, line 16, after the word "processor", delete "76," and insert therefor --76$_1$--.

At column 14, line 27, before the word "array", delete "a" and insert therefor --arranged in a linear--.

At column 15, line 11, before the first use of the words "to indicate", delete " '–' " and insert therefor --'0'--.

At column 15, line 11, before the second use of the words "to indicate", delete " '+' " and insert therefor --'–'--.

At column 15, line 22, before the word "combined", delete "is" and insert therefor --are--.

Signed and Sealed this

Thirteenth Day of November, 2007

JON W. DUDAS
*Director of the United States Patent and Trademark Office*